Feb. 26, 1924.  
F. SÁNDOR  
1,485,297  
TYPEWRITING MACHINE  
Filed June 18, 1921   18 Sheets-Sheet 1
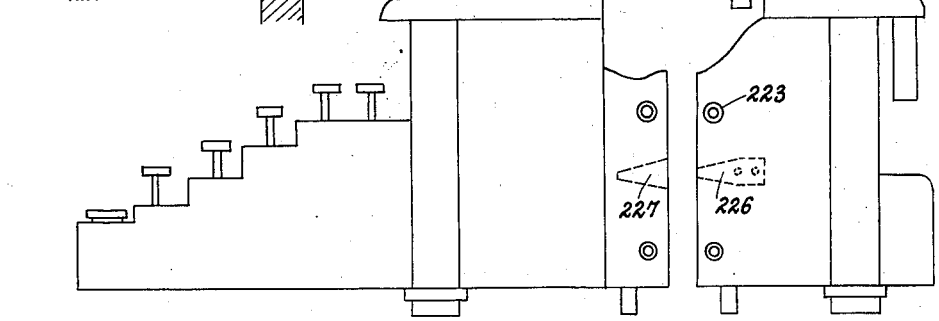
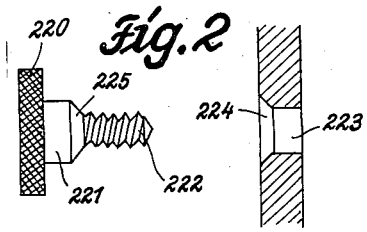
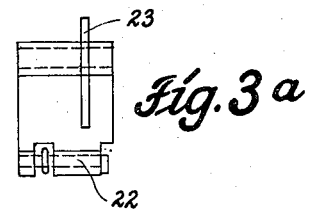
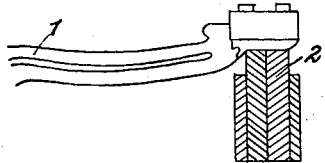
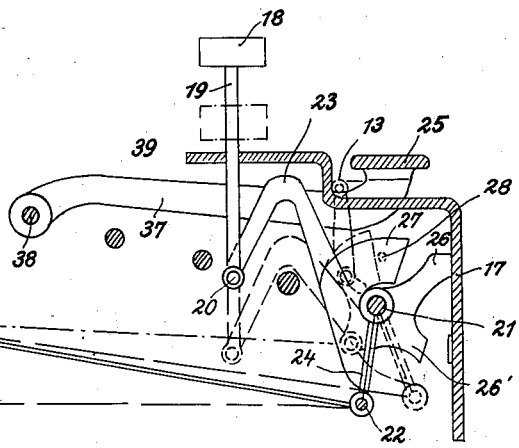
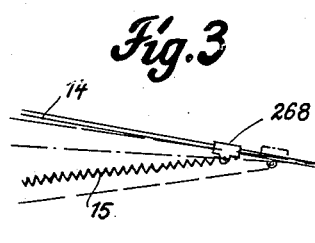

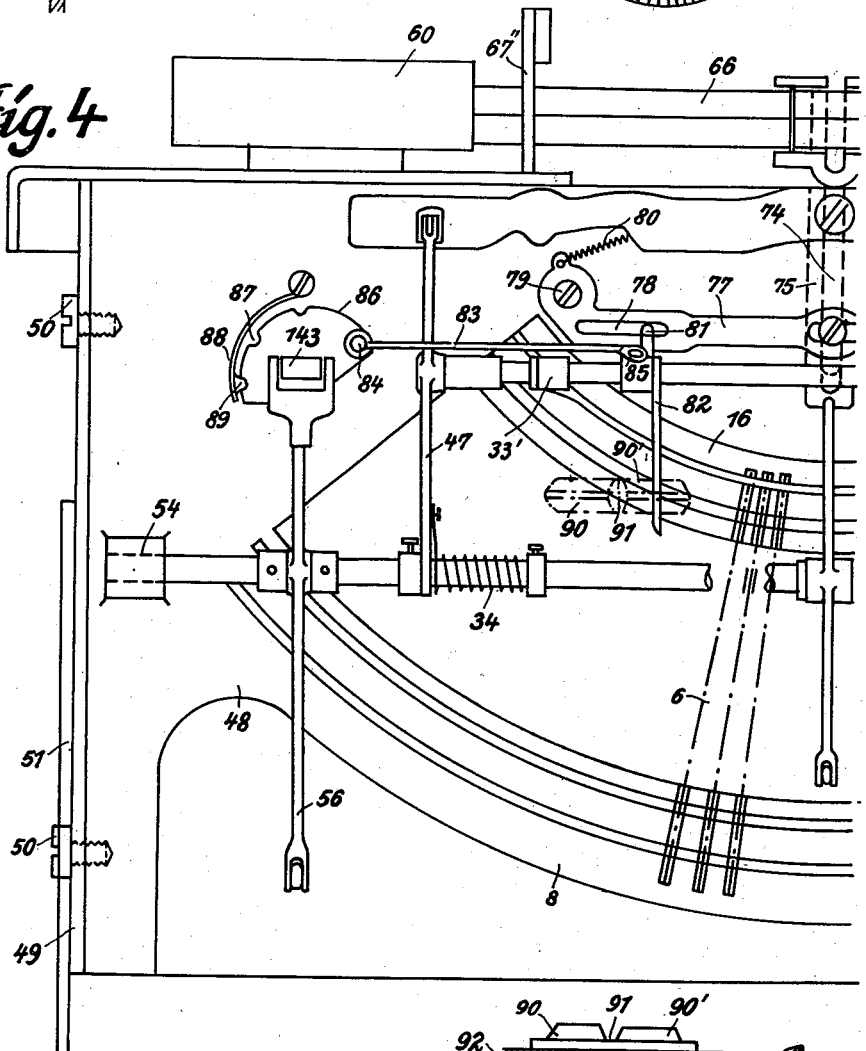

Feb. 26, 1924.
F. SÁNDOR
1,485,297
TYPEWRITING MACHINE
Filed June 18, 1921    18 Sheets-Sheet 4
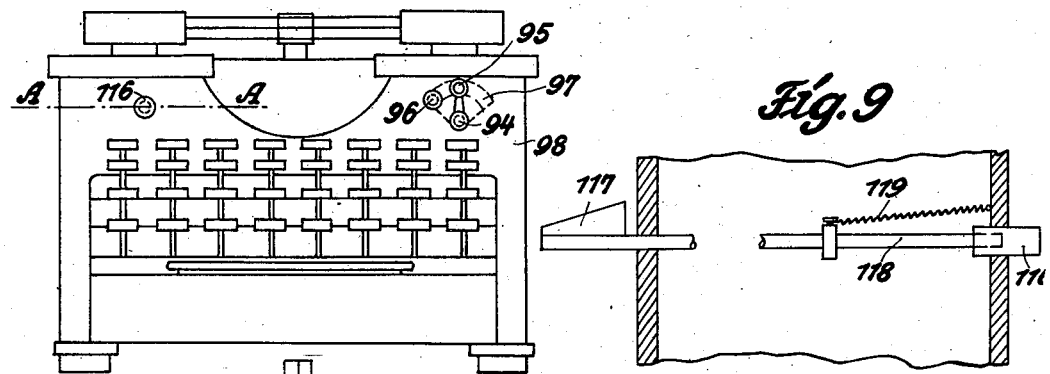
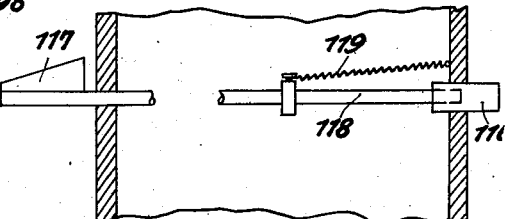
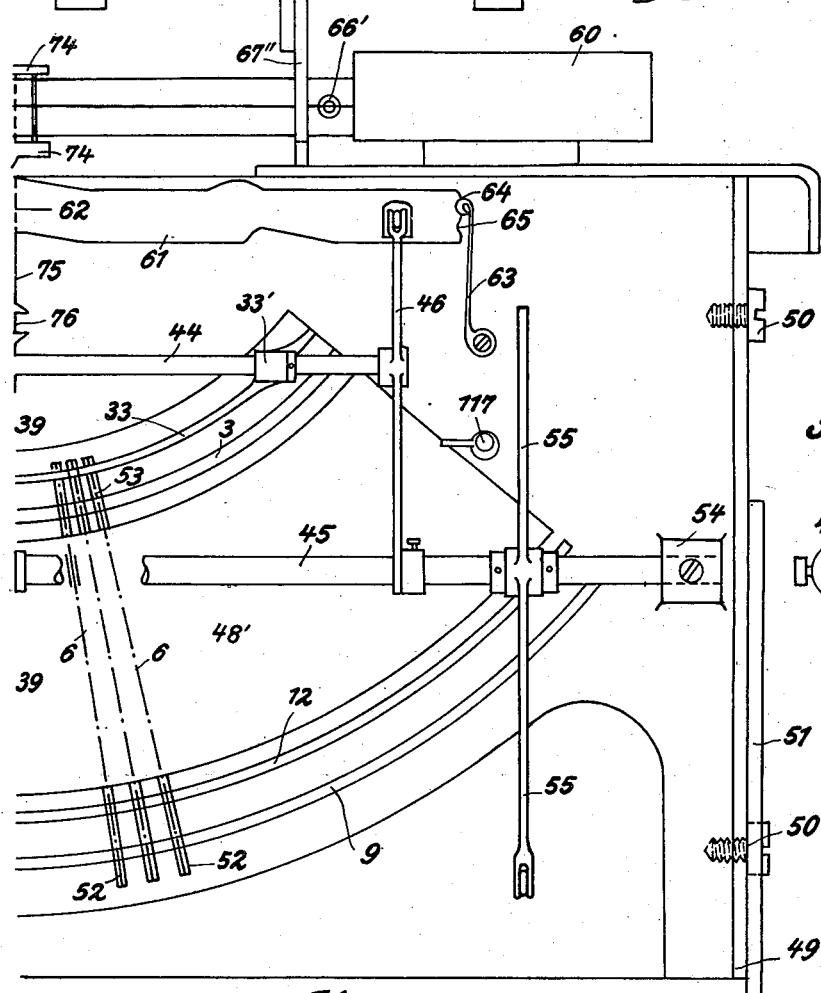

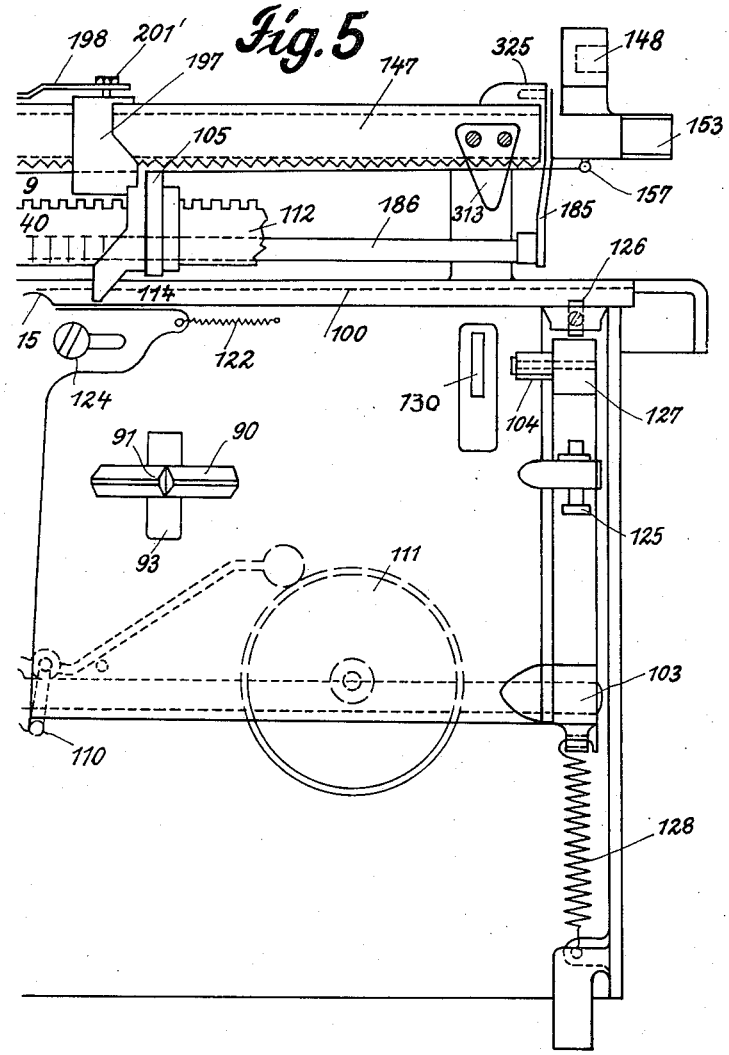

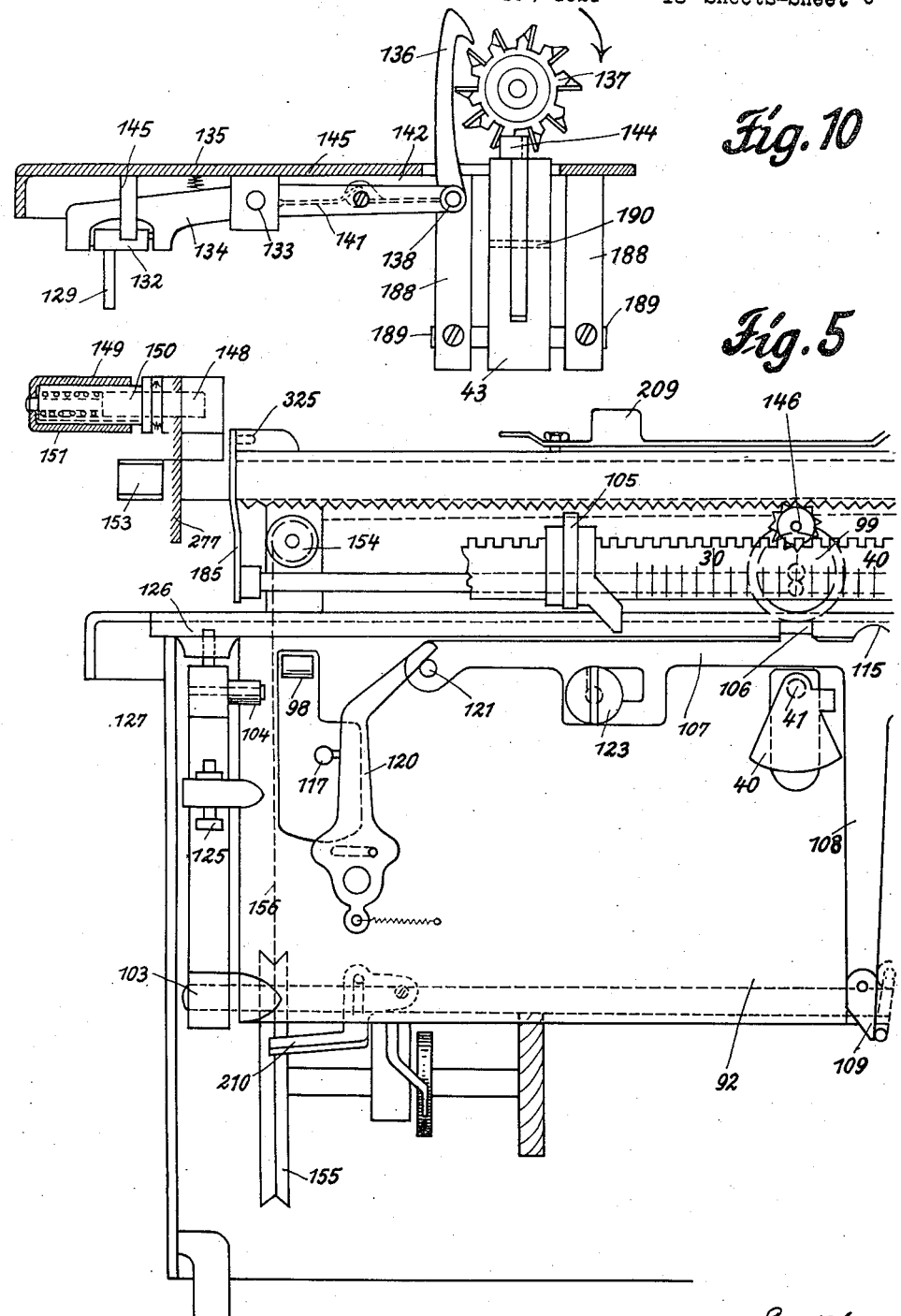

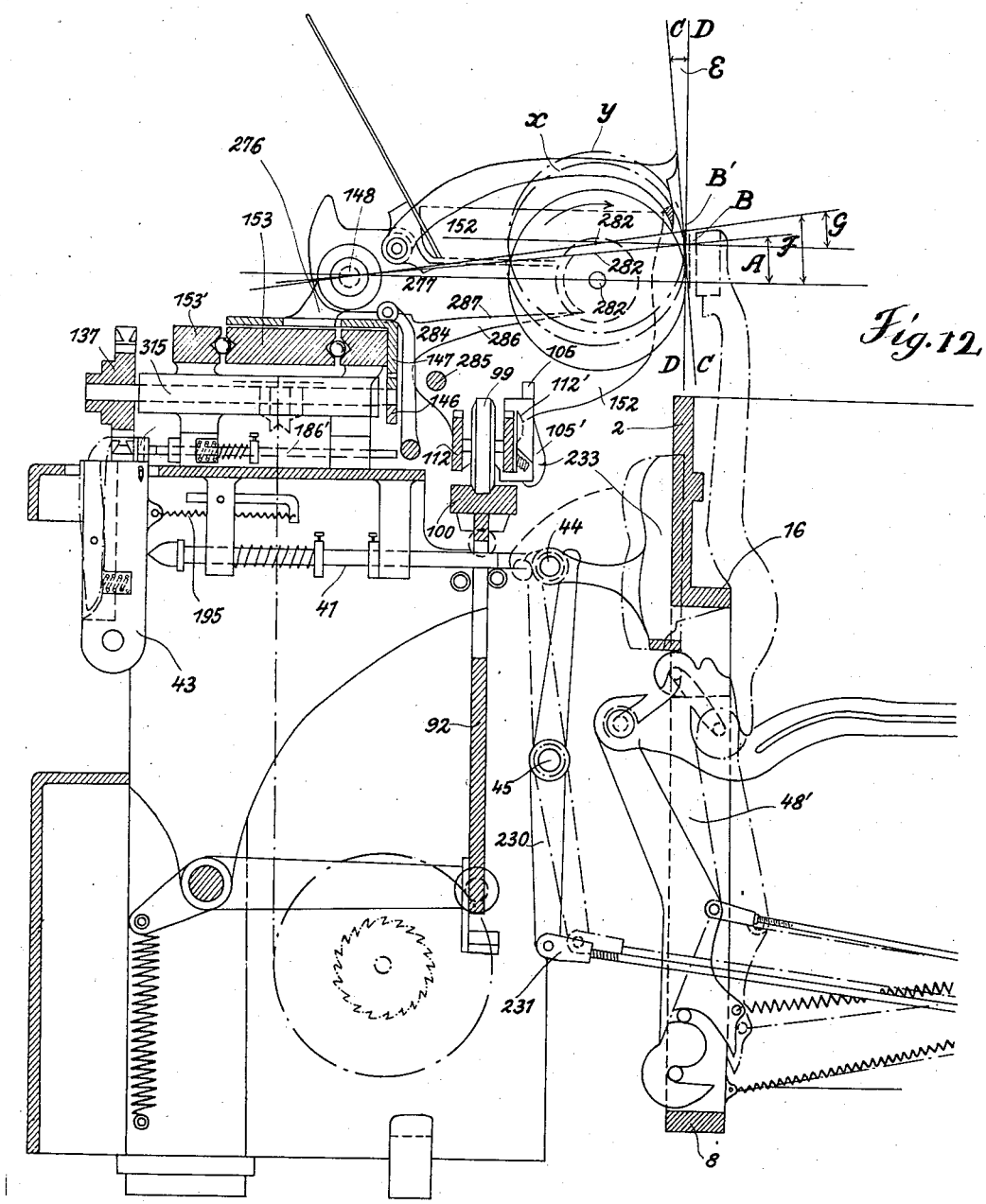

Feb. 26, 1924.
F. SÁNDOR
1,485,297
TYPEWRITING MACHINE
Filed June 18, 1921  18 Sheets-Sheet 8
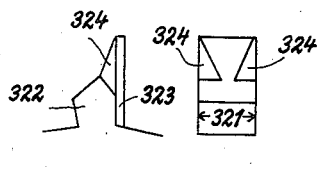
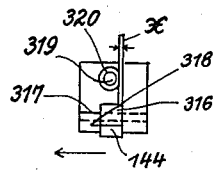
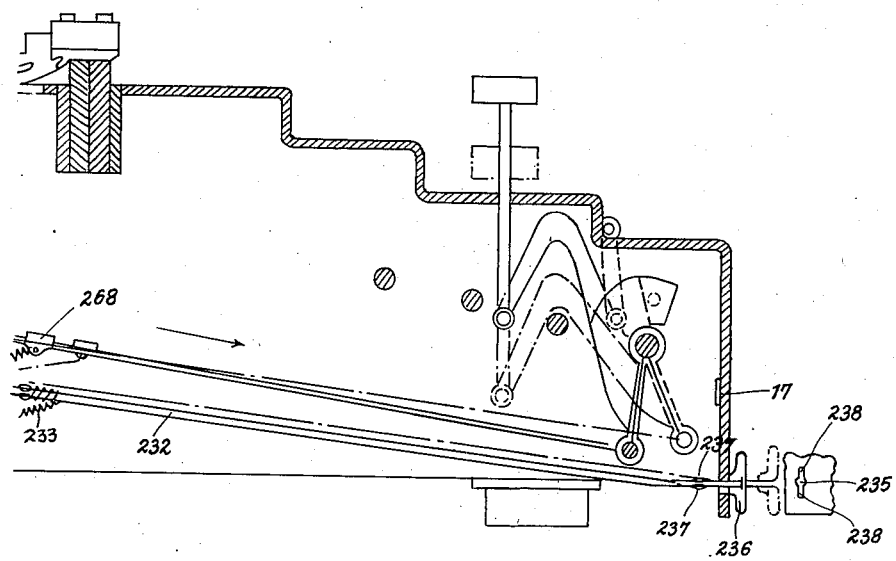

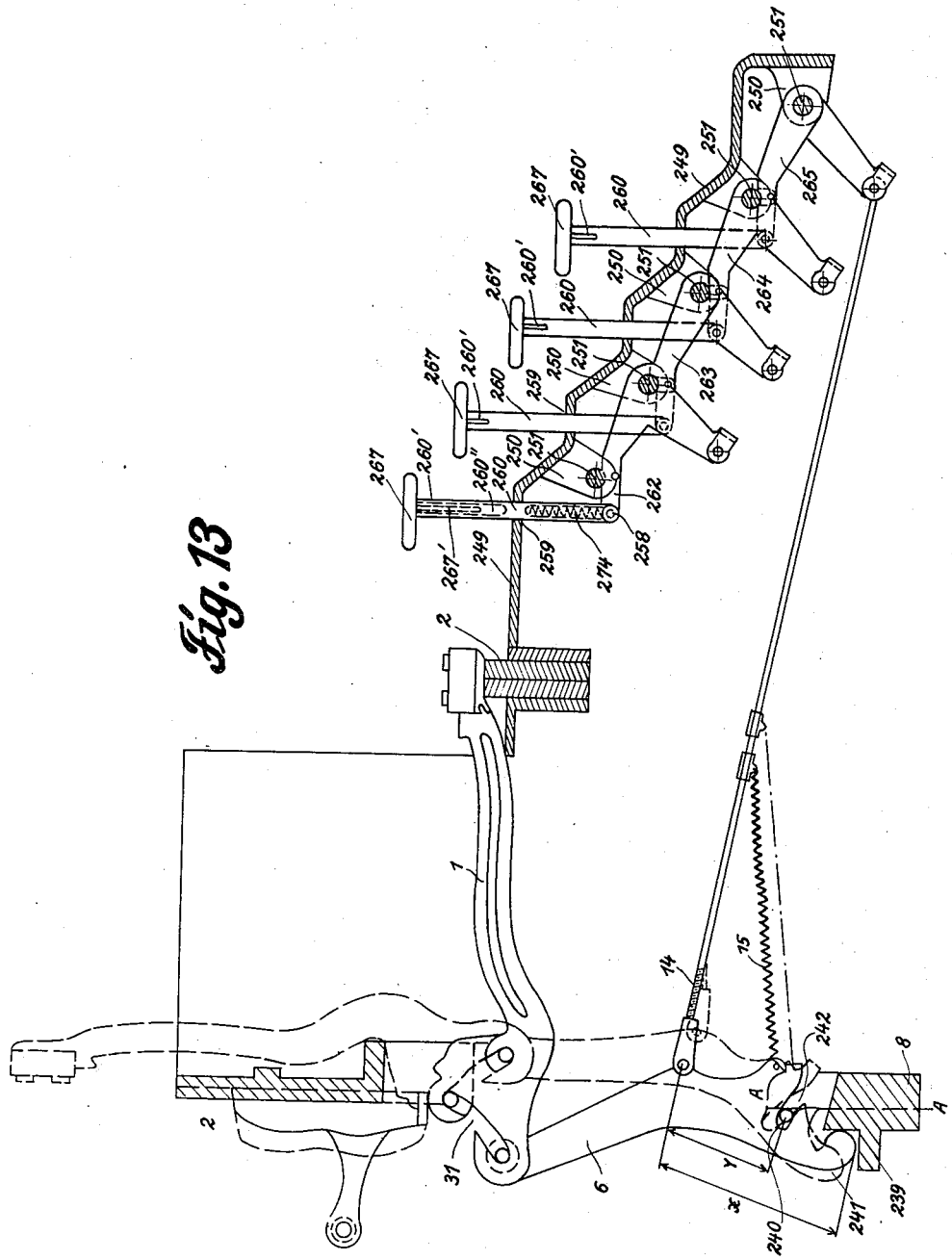

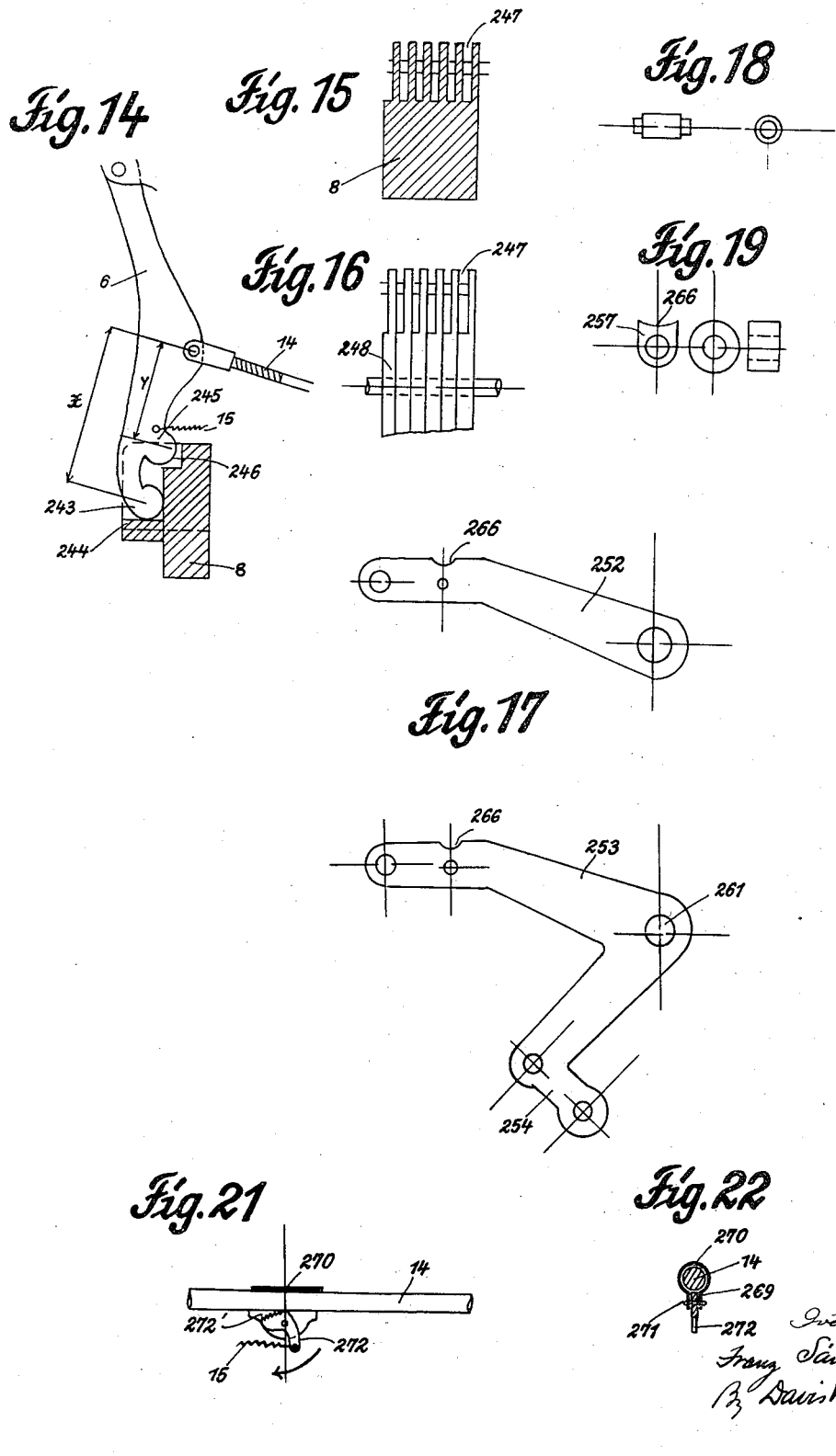

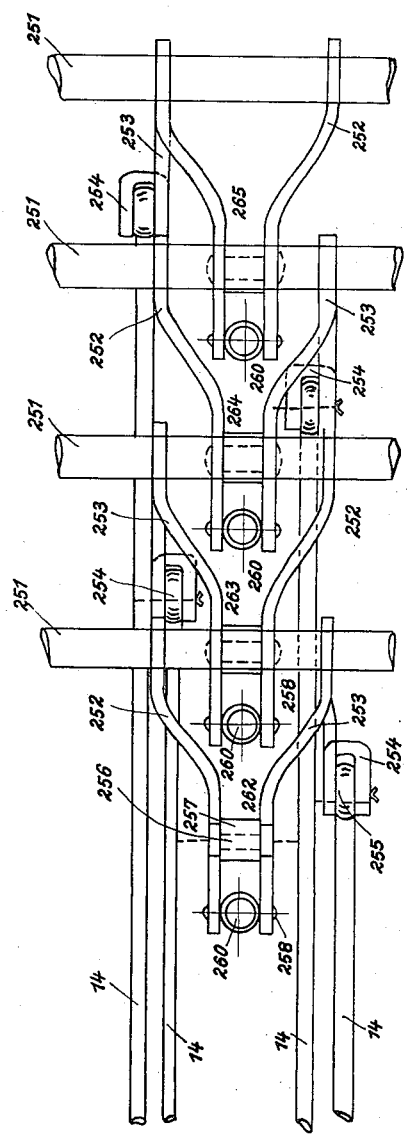

Feb. 26, 1924.
F. SÁNDOR
1,485,297
TYPEWRITING MACHINE
Filed June 18, 1921   18 Sheets-Sheet 12
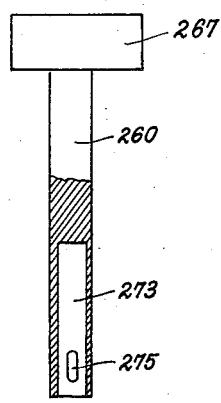
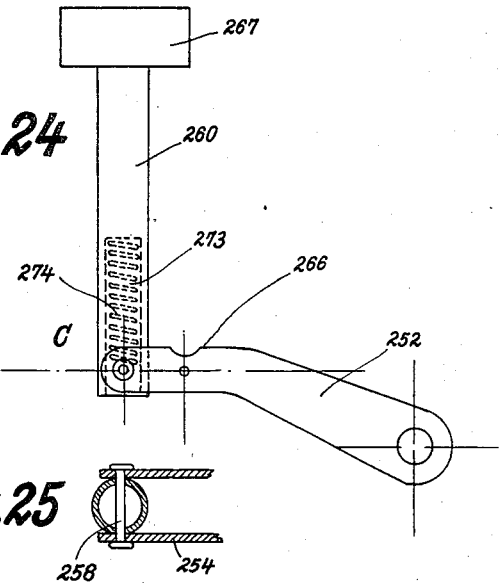

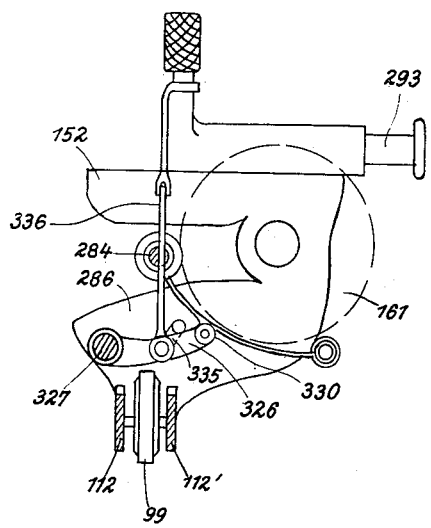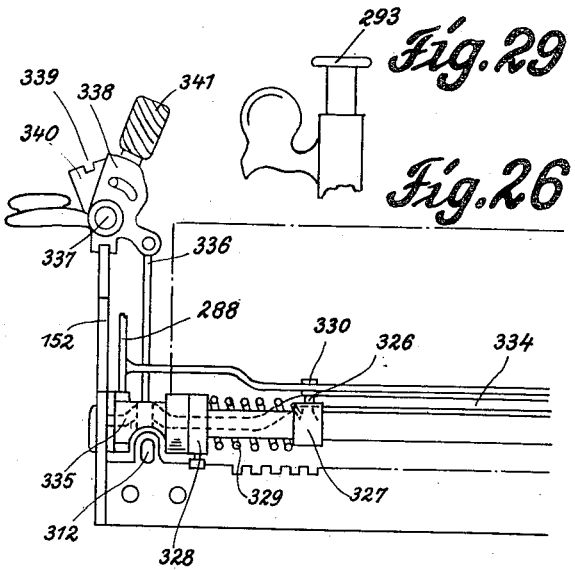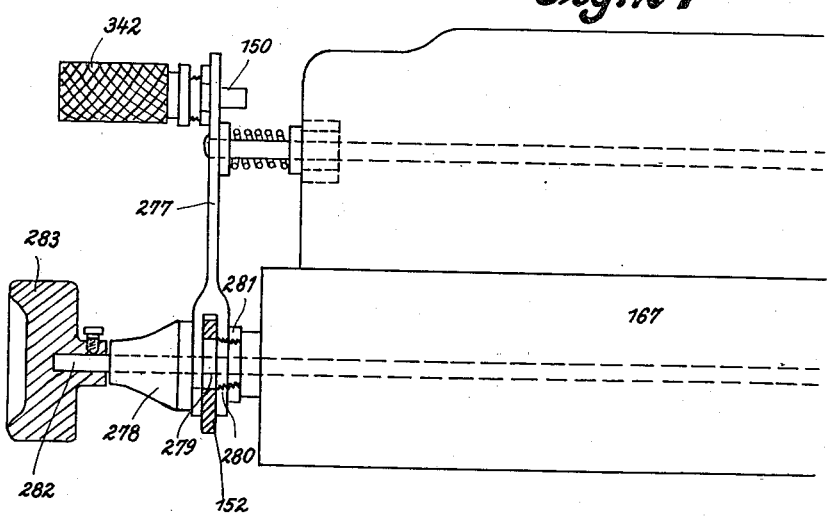

Feb. 26, 1924.
F. SÁNDOR
1,485,297
TYPEWRITING MACHINE
Filed June 18, 1921  18 Sheets-Sheet 15
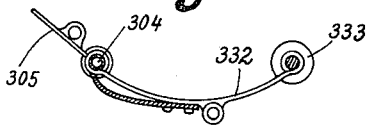
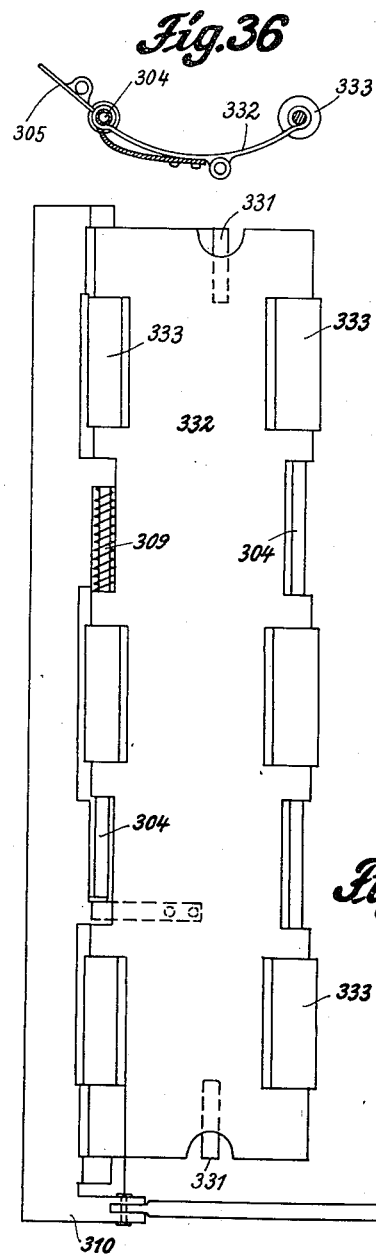
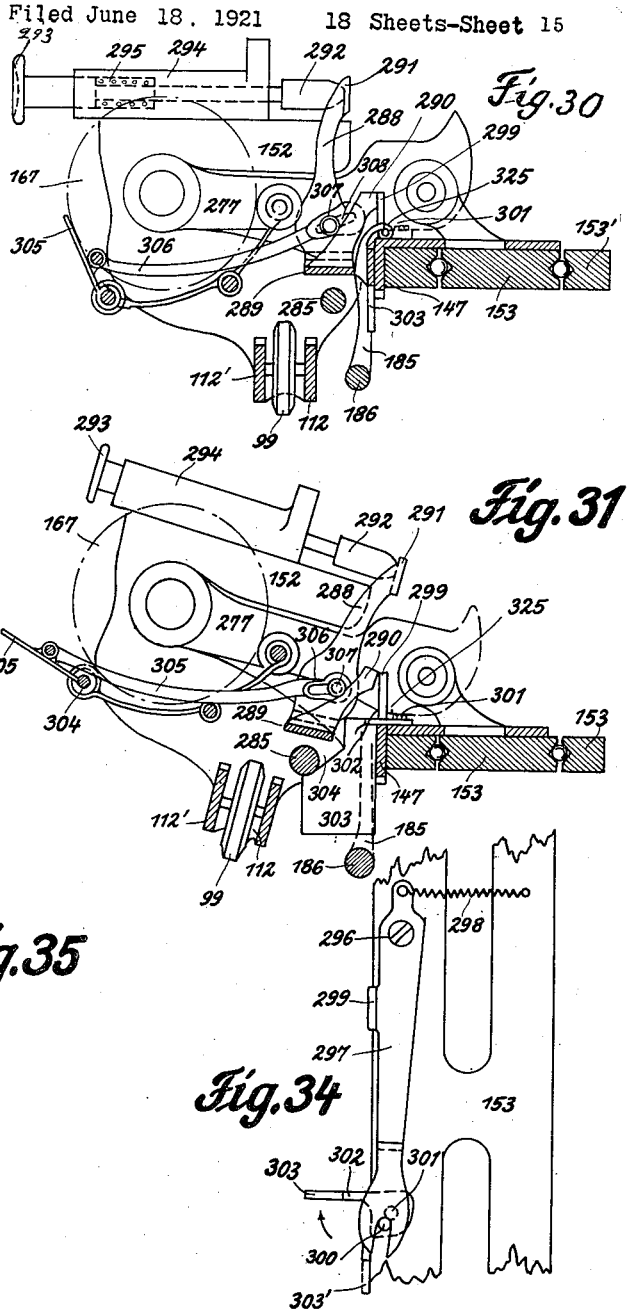

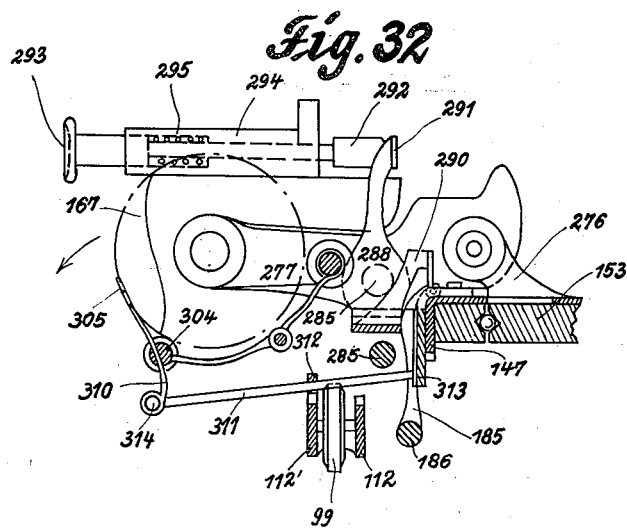
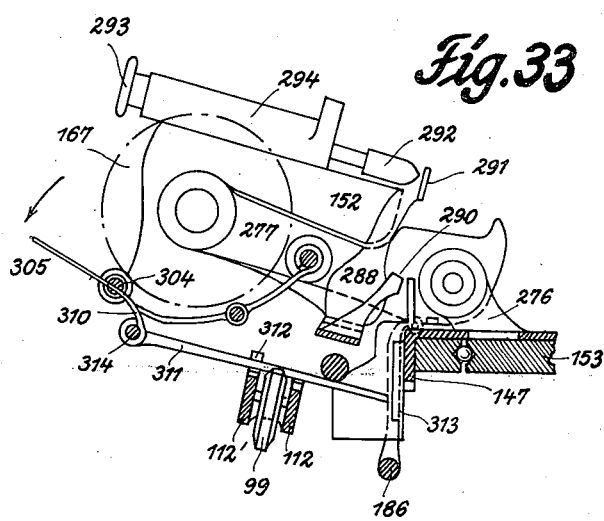

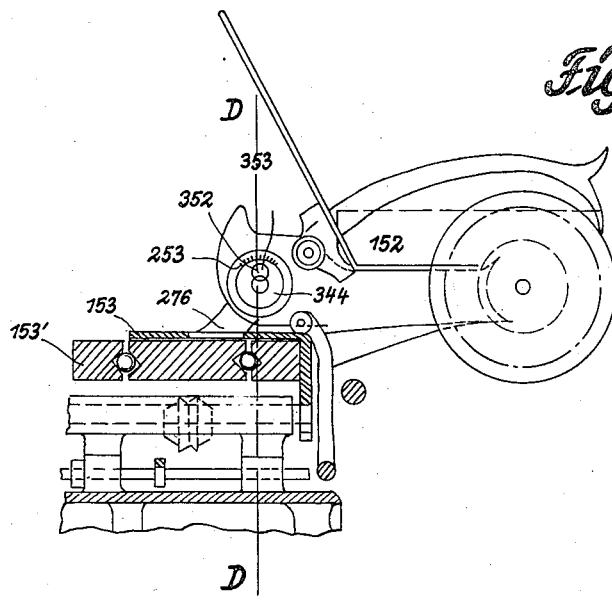
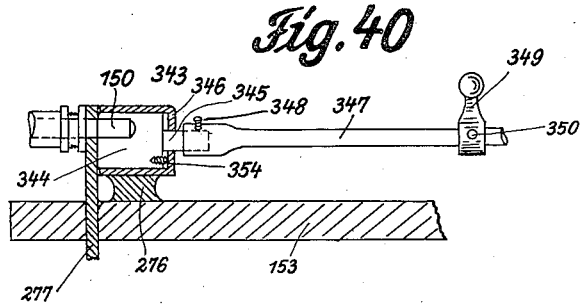
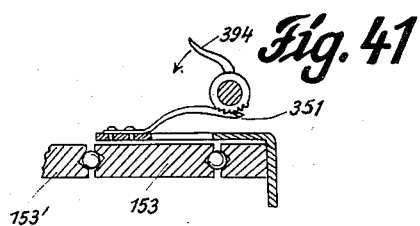

Feb. 26, 1924.  
F. SÁNDOR  
1,485,297  
TYPEWRITING MACHINE  
Filed June 18, 1921   18 Sheets-Sheet 18

Patented Feb. 26, 1924.

1,485,297

UNITED STATES PATENT OFFICE.

FRANZ SÁNDOR, OF ERFURT, GERMANY, ASSIGNOR TO DEUTSCHE WERKE AKTIEN-GESELLSCHAFT, OF BERLIN, GERMANY, A CORPORATION OF GERMANY.

TYPEWRITING MACHINE.

Application filed June 18, 1921. Serial No. 478,675.

(GRANTED UNDER THE PROVISIONS OF THE ACT OF MARCH 3, 1921, 41 STAT. L., 1313.)

*To all whom it may concern:*

Be it known that I, FRANZ SÁNDOR, a citizen of the Hungarian Republic, and residing at Erfurt, in the German Republic, have invented certain new and useful Improvements in Typewriting Machines (for which I have filed application in Germany Nov. 24, 1919, Patent No. 339,406; in Germany Mar. 27, 1920; in Switzerland Jan. 6, 1920, Patent No. 92,152; in Hungary Mar. 6, 1918), of which the following is a specification.

This invention relates to a typewriting machine in which the typed matter is exposed to view constantly, and it has for its object to improve the construction of machines of this type as regards the general construction of the type lever system, of the key lever system, of the mounting of the frame for the platen, of the mounting of the carriage, of the spacing mechanism and of the platen construction in such a manner that a typewriting machine is created which is not only very practical in use but presents further the advantage of great simplicity of construction which is very important for the manufacture of the machine.

In order that the invention may be clearly understood, I shall proceed to describe the same with reference to the several forms of construction shown in the accompanying drawings, wherein:—

Fig. 1 is a diagrammatical side elevation of the typewriting machine.

Fig. 2 shows on a larger scale, an arrangement for coupling the two halves of the typewriting machine.

Figure 3:
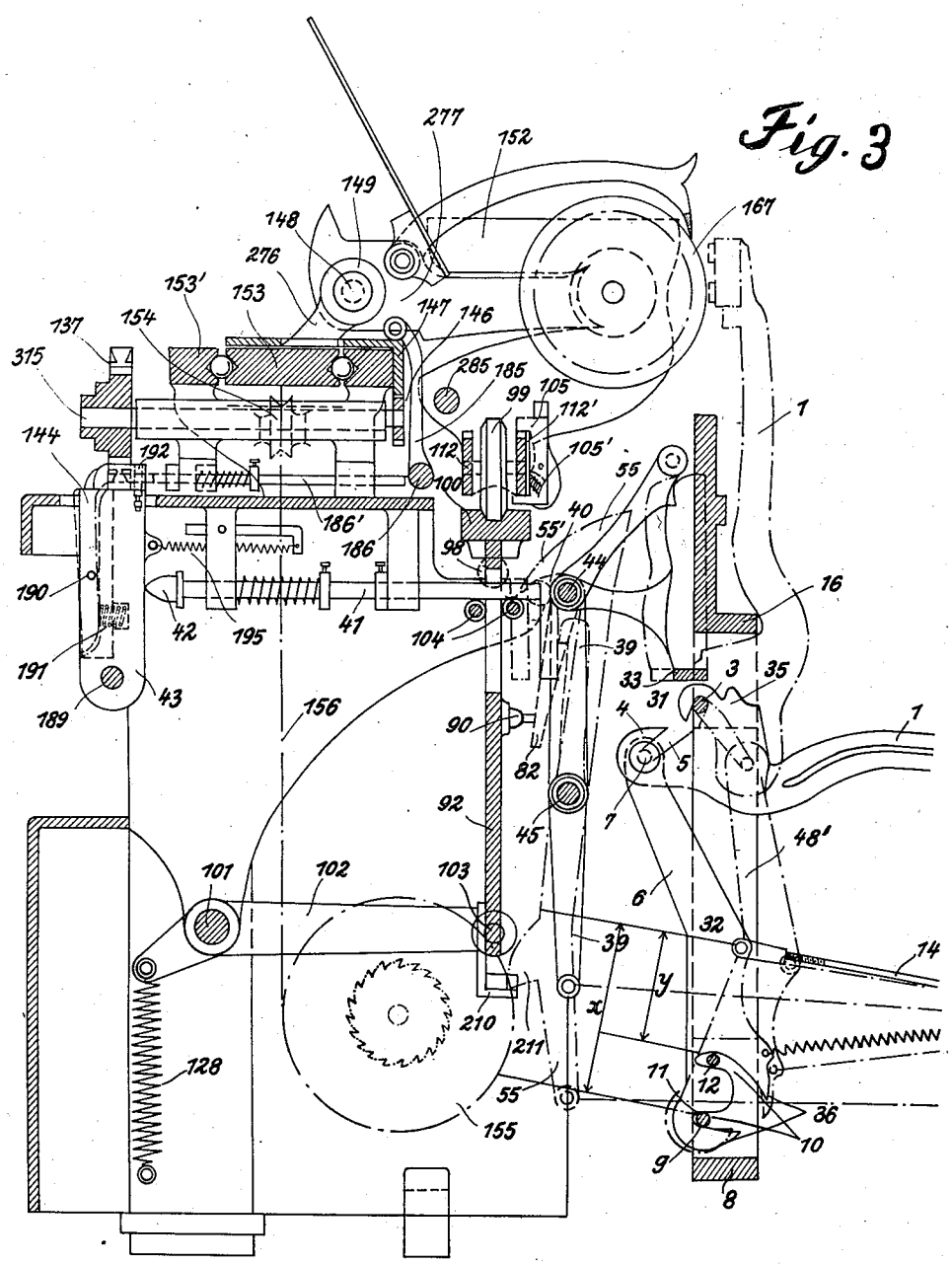
Fig. 3 is a middle section in natural size vertical to the plane of division.

Fig. 3ª shows a detail of the key levers according to Fig. 3.

Fig. 4 is a rear elevation of the front frame of the typewriting machine.

Figs. 4ª and 4ᵇ show constructional details of Fig. 4.

Fig. 5 is a front elevation of the rear frame of the typewriting machine.

Fig. 6 is a side elevation and vertical middle section of the ribbon feeding device.

Fig. 7 shows this device in plan view.

Fig. 8 represents, on a smaller scale, a face view of the front frame of the typewriting machine.

Fig. 9 is a horizontal part section on line A—A of Fig. 8 on a larger scale.

Fig. 10 is a part view of the rear frame of the typewriting machine relating to the return mechanism.

Fig. 11 shows part of the return mechanism for the frame of the platen.

Fig. 12 is a middle section vertical to the plane of division of the machine illustrating another form of construction of the typewriting machine.

Fig. 13 is a similar view illustrating a third form of construction of the typewriting machine.

Fig. 14 shows another form of construction of the intermediary levers.

Fig. 15 is a vertical section on line A—A of Fig. 13.

Fig. 16 is a similar section illustrating another form of construction of the segment.

Fig. 17 shows details of the key levers.

Fig. 18 represents on a larger scale a bolt serving for the connection of the different parts of the key levers.

Fig. 19 shows on a larger scale an abutment block to be inserted between the different parts of the key levers.

Fig. 20 is a plan view of a part of the type lever system, the guide plate for the keys being imagined as transparent.

Fig. 21 represents, on a larger scale, an adjustable shackle for fixing the spring of the pull rod to said pull rod.

Fig. 22 is a cross section on line B—B of Fig. 21.

Fig. 23 is a vertical section on a larger scale, through the key shown in Fig. 13.

Fig. 24 is an elevation of this key in connection with a part of the intermediary lever.

Fig. 25 is a section on line C—C of Fig. 24.

Figure 26:
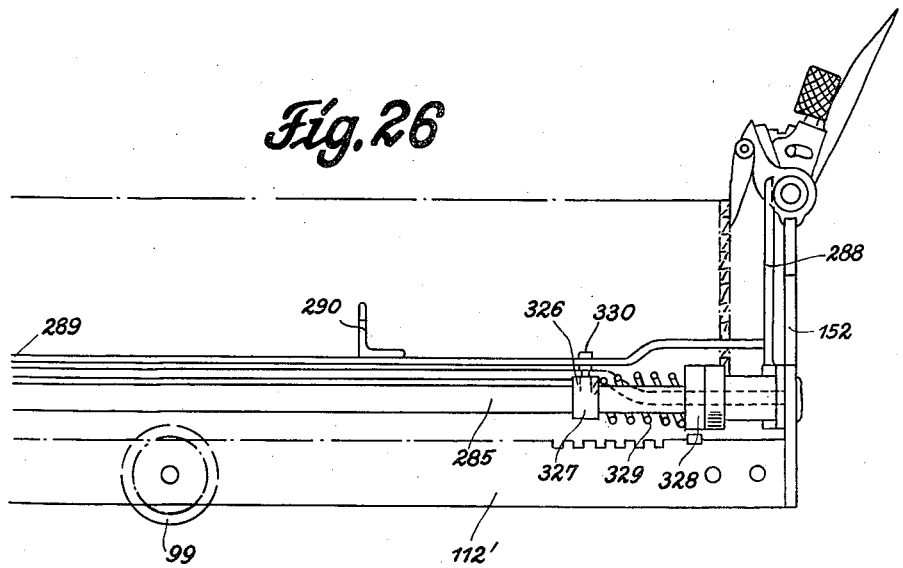

Fig. 26 is a rear view of the frame of the platen.

Figure 27:
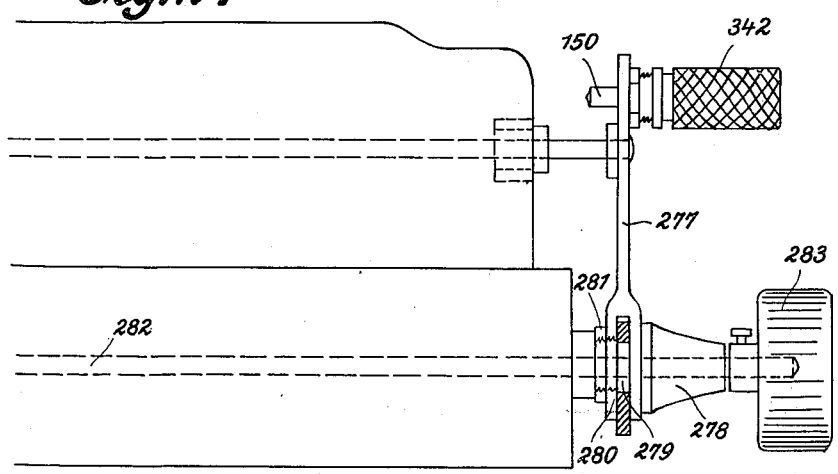

Fig. 27 shows in plan view the platen with its supporting frame.

Fig. 28 is a side elevation of Fig. 26.

Fig. 29 represents a detail of Fig. 28.

Fig. 30 is a side elevation of the carriage, its guide being shown in section.

Fig. 31 shows a similar view as Fig. 30 the frame of the platen being represented in lifted position.

Fig. 32 is a side elevation of another form of construction of the carriage in a similar view as in Fig. 30.

Fig. 33 shows the carriage according to Fig. 32, the frame of the platen being lifted.

Fig. 34 illustrates a top view of a device for locking the frame of the platen in the lifted position shown in Figures 31 and 33.

Fig. 35 is a plan view of the clamping device for the paper sheet.

Fig. 36 is a vertical cross section of this device.

Fig. 37 represents on a larger scale, a tooth of the dividing- and ratchet wheel.

Fig. 38 is a plan view, also at an enlarged scale, of the dividing- and ratchet knife.

Fig. 39 is a side elevation of an adjustable bearing for the frame of the platen, the carriage guide being shown in cross section.

Fig. 40 is a vertical middle section on line D—D of Fig. 39.

Fig. 41 is a vertical middle section of Fig. 40.

Figure 42:
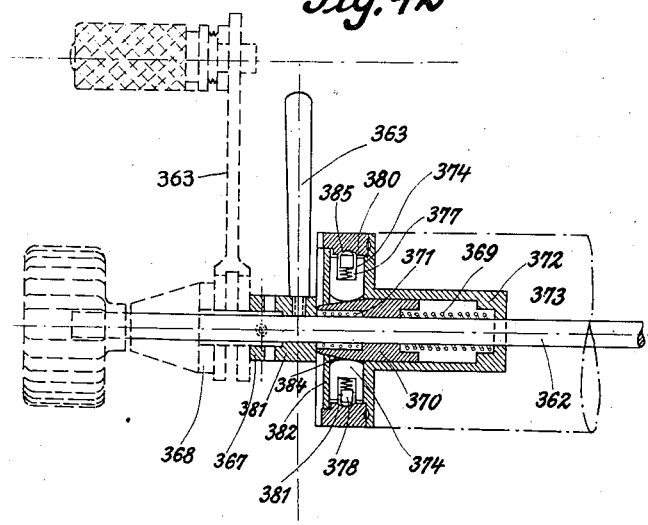

Fig. 42 is an axial section through a coupling device for the platen.

Figure 43:
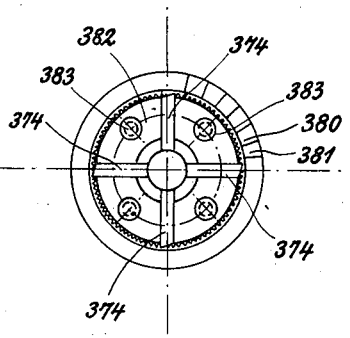

Fig. 43 is an end view of Fig. 42, the coupling being disconnected.

Figure 44:
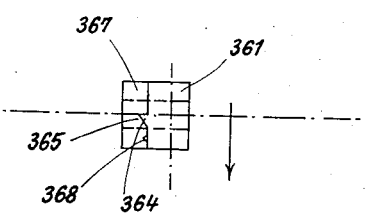

Fig. 44 shows a coupling sleeve and its counter bearing (constructional details of Fig. 42).

Figure 45:
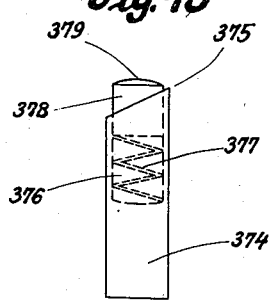

Fig. 45 is the side elevation of a coupling knife shown on a larger scale.

As can be seen from the diagram, Fig. 1, the typewriting machine is composed of two separate halves. Each half of the machine, the front frame as well as the rear frame, forms by itself a total of perfect stability. The two parts are connected to form a complete typewriting machine by means of a coupling device which can be easily disconnected. This coupling device consists in the present case of four screws 220, two at either side of the machine. These screws 220 are exactly guided in a part of the machine, e. g. in the front frame, by means of a cylindrical neck 221, and screwed with their threaded part 222 into a corresponding female thread 223 of the other part of the machine, e. g. the rear frame. The conical part 224 which is coaxial to the threaded part 223 serves to ensure—together with the counter cone 225 of the screw—the accurate fit of the two parts. In order to facilitate the fitting of the threaded borings, guide pieces 226 and 227 can be used. The coupling could also be effected in any other convenient manner.

According to the invention the key system, including the return key and the reversing key for the platen, the type bars with the segment shaped bearing, the spools for the inking ribbon with the devices for the transporting, raising, and reversing of the inking ribbon, and the universal bar are arranged in the front frame of the typewriting machine, the carriage with its bearings, the means for moving and guiding the same, the devices for the return of the platen and for adjusting the position of the said platen, and the margin stops being mounted in the rear frame. Owing to this subdivision it is possible to utilize fully the advantages of the novel machine.

The front frame which comprises the keys and the type lever system can be exchanged against a front frame with other types, e. g. types for another language. As the type system is exchanged with the type lever system an absolutely new machine for another language is obtained by the exchange of the front frame. On the other hand the rear frame could be exchanged against a rear frame having a specially large carriage so that—the type lever system and the key system remaining as they are— specially large paper sheets could be typed. The subdivision of the typewriting machine into two independent and individual frames is of special advantage also for the putting together of the typewriting machine in the factory or for repairs. If for example the key system or the type lever system has to be repaired, only the front frame will have to be sent for repair instead of the whole machine as at present. The same relates to the rear frame. The coupling is of such simple construction that it can be uncoupled by anyone, so that no skilled workman is required for this purpose, any typist being able to take the machine to pieces and to clean the same thoroughly. In order to ensure a proper working together of the parts mounted in the front frame with the parts situated in the rear frame special arrangements have been made which will be more particularly described hereinafter.

The rear wall of the front frame is formed by an essentially rectangular casting 48 which is fixed between the sidewalls 49 of the front frame by screws 50 and which aids to give the required solidity to the front frame (Fig. 4). In this casting, which may be called a segment plate, the type levers are located in an upper segment edge 16, the intermediary levers being located in a lower concentric segment edge 8.

The type levers or bars 1 (Fig. 3) rest, at their normal position of rest upon a bolster or cushion 2; they are pivotally mounted upon a rod 3 located in the upper segment 16 (compare also Fig. 4) and bent along the circumference of a circle. The lower extensions 4 of the type-bars have each a slot 5 with which engages a stud 7 rigidly connected with the intermediary lever 6. The intermediary lever 6 is pivotally mounted upon two concentric rods 9 and 12 of the lower segment 8 by means of two curved slots 10. A connecting rod 14 is hingedly connected with the intermediary lever by means of a link 32 and adapted to be operated by the key 18. The special construction of the type-bar system and of the key system will be more particularly described hereinafter. At present it is important to state that the type-bar is constructed so that—when moving from the position of rest into the typing position—it is adapted to control a universal bar 33 designed to operate the mechanism which effects the adjusting of the carriage. In the form of construction shown by way of example the type-bar has a small nose 35 which comes in contact with the universal bar 33 and pushes the same gradually back into the position shown in Fig. 3 in dotted lines according to the progressive movement of the type-bar.

Other movable parts of the front frame are: the space lever 39 and the back-space lever 56 (compare Figures 3 and 4). These two parts can be connected with the pertinent keys, viz., the space key 25 and a back-space key not shown in the drawing, in any convenient manner, e. g. similar to the connection of the type levers by connecting rods.

In order to ensure a secure and simple cooperation of the movable parts of the front frame of the machine with the movable parts of the rear frame, a shaft 45 is transversely mounted upon the rear wall of the segment plate fixed in the front frame and forming the back-wall thereof, which is designed to transmit the movements from the front frame to the rear frame. This shaft 45 is securely mounted at either side of the segment plate 48 in small bearings 54 which are preferably cast with the segment plate (see Fig. 44). Upon this shaft 45 the following parts are mounted: at the left the back-space lever 56 (Fig. 4) which effects the change of the position of the platen, at the middle the space key lever 39 and at the right the shift lever 55. There are further pivotably mounted upon this shaft 45 two arms 46 and 47 connected the one with the other by an oscillating shaft 44 upon which, by means of small bearings 33' the movable releasing bridge or universal bar 33 is mounted. An angle lever 82 is also pivotably mounted upon the oscillating shaft 44, said angle lever being also movable in axial direction.

Arms 57 for actuating the inking ribbon are hinged one to the upper end of each of the arms 46 and 47, said arms 57 engaging with the ratchet wheel 58 (see Figures 6 and 7) and effecting the reciprocating movement of the inking ribbon.

When a key is depressed the corresponding type lever pushes by its nose 35 the releasing bridge or universal bar into the position shown by Fig. 3 in dotted lines, whereby the oscillating axle 44 is made to push back the spacing rod 41 mounted elastically in the rear frame so that it stands perpendicular to the plane of division, and the end 42 of said spacing rod 41 pushes back the dog rocker 144, whereby the advance of the carriage for the space of one type is effected. When the type lever drops back the universal bar moves forward again under the action of the spring 34 mounted upon shaft 45, the same as the spacing rod 41 and the dog rocker 144 is brought back to its locking position by the action of the spring 195.

By the return movement of the universal bar or of the shaft 44 carrying the same, the feeding mechanism for the inking ribbon is actuated simultaneously by means of the lever 82 pivotally mounted upon the oscillating shaft 44. The lower lever arm of this lever 82 comes in contact with an abutment ridge 90 fixed upon the reversing plate 92 arranged in the rear frame of the typewriting machine. The right hand side part 90' of this abutment ridge is lower than its left hand side part (Fig. 4ᵇ). Between the two parts of the abutment ridge of different lengths a notch 91 is provided. When the releasing bridge 33 oscillates backwards the angle lever 82 must oscillate also as the abutment ridge 90 serves as counter bearing, whereby the second arm 81 of said angle lever is raised. This lever arm 81 engages with the slot 78 of a lever 77 and lifts the same, whereby the inking ribbon 66 is lifted which is guided in the fork 74 connected with the lever 77 by a stud 76. When the universal bar is returning to its normal position the lever 77 and the fork 74 of the inking ribbon drop back also, the spring 80 acting upon the lever 77 assisting the action of the weight of the three parts 74, 77, 82.

When the movement of the inking ribbon has to altered for typing in another colour or colourless, the angle lever 82 is displaced along its axle 44. With this object in view a traction rod 83 is hingedly connected with the aid of a stud 85 with the angle lever 82. This displacement is effected by a shifting lever 86 adapted to pivot around an axle which stands perpendicular to the plane of division of the typewriting machine. This shifting lever 86 is connected with a handle 95 at the front side of the front frame by means of a shaft 94 which stands perpendicular to the division plane of the typewriting machine (see Fig. 8).

At the side of the handle 95 a small window 96 is arranged in the frame of the typewriting machine. A segment 97 connected with the shaft 94 having different indicating surfaces is adapted to make appear in this window only one of its indicating surfaces according to the adjustment of the movement of the inking ribbon. The shifting lever 86 is secured in its different positions by the fact that it is constructed in the shape of a segment of a circle having notches 87 in its circumference designed to receive the nose 89 of a spring 88. When the shifting lever 86 stands at the middle the lower lever arm of the angle lever 82 is brought over the notch 91 of the abutment ridge 90. When the universal bar oscillates backwards the lever 82 will therefore find no resistance and the inking ribbon is consequently not lifted so that, at this position of the shifting lever 86, wax paper can be typed colourless. When the angle lever 82 is displaced still further to the left the largest stroke of the fork of the inking ribbon is produced, the lower half of the inking ribbon being thus inserted between the type and the paper. The shaft 44 which oscillates together with the universal bar 33 serves thus, actuating together with the arms 46 and 47 connected by said axle for actuating simultaneously the movement of the inking ribbon, the shifting of the inking ribbon, and the shifting of the carriage in the simplest manner.

The spacing rod 41 mounted in the rear frame of the typewriting machine and effecting the spacing of the carriage has at its front end a shield shaped abutment surface or head 40 (see Figs. 3 and 5). This abutment surface 40 serves for several purposes at the same time. Besides the oscillating axle 44 the upper end of the space key lever 39 bears upon the same. If therefore the space key 25 is depressed, and consequently the lower end of the space key lever 39 is pulled forward, its upper end presses backwards, through the intermediary of the abutment surface 40, the spacing rod 41 effecting thus the advance of the carriage for the width of one type.

The abutment surface 40 serves further for locking the striking of the types when the carriage has reached its left hand end position. A rail 107 is mounted upon the shift plate 92 arranged in the rear frame of the typewriting machine so that it can pivot around a pin 124 and so that it can be displaced in longitudinal direction. When the boss 115 of rail 107 is run over by the margin stop 114 of the carriage, it actuates at first the signal bell 111 whereupon it returns to its horizontal position. When the carriage arrives at its end position it bears against the locking nose 106 of the rail 107 and draws said rail along against the action of the spring 122. The arm 108 of the rail gets at this occasion behind the abutment surface 40 so that the space rod 41 connected with said abutment surface 40 can now no longer be pushed back. As however the oscillating shaft 44 bears also against the abutment surface 40 the universal bar 33 can also not move back when the abutment surface 40 is locked so that the type actuating device is locked in this position. If, although the typewriting machine is locked, several types should have still to be typed, the button 116 at the front side of the front frame is to be depressed (see Figs. 8 and 9). This button 116 is elastically connected with the rod 118 elastically mounted in the front frame by means of a spring 119 and standing perpendicular to the plane of division of the machine, said rod 118 carrying at its end, which is turned towards the rear frame, a horizontal wedge face 117 (Fig. 9).

This horizontal wedge face 117 acts, as shown in Fig. 5, upon a lever 120 elastically mounted upon the shifting plate 92 and bearing against a stud 121 of the rail 107. When the knob 116 is being depressed the lever 120 oscillates to the right, presses the rail 107 down and disengages its locking nose 106 from the margin stop 114. The rail 107 is now free and returned to its initial position by the action of the spring 122. The arm 108 of the rail is now again moved from behind the abutment surface 40, whereby the rod 41 and consequently the type stop are unlocked.

The simple construction of the front end of the shifting rod 41 as a shield-like abutment surface permits the space key lever and the oscillating shaft 44 to act upon the same simultaneously and the locking rail 107 to lock the spacing rod 41.

In the front frame of the typewriting machine the spools 60 of the inking ribbon (Figs. 6 and 7) and the devices for rotating the same are arranged. In order to reverse the direction of the feeding device for the inking ribbon the shifting arms 57 for the inking ribbon which are hingedly connected with the oscillating arms 46 and 47 are brought alternately in or out of engagement with the corresponding ratchet wheels 58. This is effected with the aid of an oscillating bridge 69 arranged in the front frame of the machine upon the rear side of the segment plate 48. This bridge 61 oscillates after the manner of a scale beam around the pivot 62 which serves at the same time for the vertical guiding of the fork 74 of the inking ribbon.

The bridge 61 has at its ends arms 70 bent over forwardly and designed to get below the shifting arms 57 of the inking ribbon. These arms 57 are continuously pressed downward by the action of springs, preferably blade springs 73 fixed to the horizontal cover plate 68. The horizontal arms 70 carry at their front ends vertical upwardly directed flaps 69 upon which rollers 72 are fixed. The reversing levers 67 for the inking ribbon are pivotally mounted upon the pivots fixed in the cover plate. This flat horizontal reversing lever 67 has a downwardly bent end 67' which presents an inclined wedged surface adapted to come in contact with the roller 72. The other end of the lever 67 is bent upward to form a vertical arm 67''. This vertical arm has a vertical slot 71 for the passage of the inking ribbon. In the ends of the inking ribbon eyes or similar abutments are arranged which are larger than the slot 71 so that when the inking ribbon has been unwound from the spool the lever 67 is turned in the direction of the arrow (Fig. 7) by the action of the corresponding eye. At this turning movement the wedge face 67' presses the arm 70 of the bridge 61 downward so that the shifting arm 50 of the inking ribbon can engage under the action of the spring 73 with the teeth of the ratchet wheel 58.

Through the downward movement of the one end of the bridge its other end is lifted so that its other arm 70 gets under the other shifting arm 57 of the inking ribbon and lifts the same out of engagement with the corresponding ratchet wheel. In this manner the shifting arms 57 of the inking ribbon are alternately brought in or out of engagement with the corresponding ratchet wheels 59 by the simple operation of a lever 67 through the intermediary of the oscillating bridge 61. In order to lock the bridge 61 in its end positions it has at one of its ends (Fig. 4) two notches 65 with which engages the correspondingly shaped end 64 of a spring 63 fixed upon the segment plate. The bridge could also execute a reciprocating motion in horizontal direction instead of the oscillating motion. In this case the teeth 58 ought to be placed vertically upon the outer circumference of the ratchet wheel.

The reversing movement of the platen is transferred from the front frame to the rear frame in the following manner:

In the front frame the shifting lever 55 is pivotally mounted upon the shaft 45 (Fig. 4). Its lower lever arm is connected with the corresponding return key of the front frame as shown by Fig. 3 in a similar manner as the space-lever 39 and as the intermediary type lever 6 by means of a separate connecting rod which is not shown on the drawing. In the rear frame of the typewriting machine the reversing plate 92 is arranged. It presents at its upper end a rail 100 upon which the frame of the platen can move to and fro through the intermediary of a roller 99. The shift plate 92 is movable in vertical directions. It is guided at its upper edge at both sides by two rollers 104 (Figs. 3 and 5). Two levers 102 pivotable around the pins 103 and pivotably mounted in the rear frame upon the pins 102 are in contact with the corresponding ends of the lower edge of the shift plate 92 the other ends of said levers 102 being each under the influence of a spring 128. The tension of the spring 128 is such that it balances the weight of the frame of the platen acting upon the shift plate 92. A revoluble pulley 98 is mounted upon one side of the shift plate 92 in an opening provided in the upper part of the same (Figs. 3 and 5). Upon the same side of the shift plate 92, but at the lower part of the same, an abutment 210, having a horizontal forwardly projecting acting surface, is arranged. A nose 211 of the shifting lever 55 rests upon this abutment surface 210 when said lever is at the position of rest, whereby the shift plate is prevented from moving upwards when the frame of the platen is being lifted, its weight being thus removed from the shift plate.

When the shifting key is being depressed the lower lever arm of the shifting lever 55 being pulled forward, the nose 211 goes away from the abutment 210. At the same time the nose 55' of the upper lever arm of the shifting lever 55, said nose being curved in wedge-shape, gets under the roller 98 of the shift plate which is thus lifted together with the platen (Fig. 3). When the shifting key is released the weight of the frame of the platen and of the shift plate 92 pushes the shifting lever 55 out of the reach of the reversing plate through the intermediary of the roller 98, so that the shifting lever 55 returns to its initial position, its nose 211 bearing again upon the abutment 210. The transmission of the movement of the shifting lever and of the return lever from the front frame to the rear frame is effected in the following manner.

In the front frame the back-space lever 56 (Fig. 4) is pivotally mounted upon the fixed axle 45. The lower lever arm of the back-space lever 56 is connected with the back-space key, its upper lever arm having a roller 143. In the rear frame of the typewriting machine (see Fig. 5) (right hand side end) a slide 130 stands opposite said roller 143 so that it can move elastically in a direction perpendicular to the plane of division (see Fig. 11). The rear end of this slide 130 has a wedge shaped nose 129' which grips under a roller 132 of a lever 134 pivotally mounted upon the pin 133 in the rear frame of the typewriting machine parallel with the plane of division (Fig. 10), the left arm of said lever 134 being continuously pressed downwards by the action of a spring 135. The other arm of the lever 134 has a return pawl 136 of known type which engages with the teeth of a toothed wheel 137 designed to effect the back-space movement of the carriage. When the back-space key is being depressed the lower lever arm of the back-space lever 56 moves forward and the upper lever arm bearing with its roller 143 against the front edge of the slide 150 pushes said slide back. Its wedge-shaped surface 129' lifts thus the left lever arm of the lever 134 so that the pawl 136 descends and effects the back-space movement of the carriage for the width of one type in the well known manner. When now the back-space key is released the return lever 56, the slide 129 (under the action of the spring 139) and the lever 134 return again to the normal position.

The hereinbefore described means and devices permit to practically carry through the leading idea of the present invention, viz: the division of the typewriting machine into two absolutely separate halves, in the most simple and secure manner. Although these means represent the most favourable solution of the problem it shall not be excluded that the same purpose can be attained by other means not described nor illustrated.

Besides the division of the typewriting machine into two separate parts the invention has for its further object a special construction of the type-bar system. The purpose is to obtain for this type-bar system a transmission in itself in such a manner that at each depression of a key the intermediary lever acts with alternating lengths of leverage, whereby an acceleration of the type lever at the second half of its path is effected at the depression of the key, the dropping back of the bar being also accelerated at the first part of its return path.

This acceleration of the movements of the type-bar during the last part of its forward movement and during the first part of its return movement is of special importance for the typing speed of the machine.

It has already been proposed to use type-bar systems with different transmission but all the solutions of the problem which has been proposed are very complicated and render the touch more difficult owing to the fact, that according to the constructions known the type-bar system is suspended upon several separate axles in order to permit of varying the transmission, whereby the type-bar system is complicated very much and the resistance from friction is greatly increased.

According to this invention these inconveniences are obviated by mounting the intermediary levers, but only these, upon two fulcrums which come successively into action. In this manner it is obtained that the intermediary lever works at every depression of the key with varying length of leverage. This type-bar system is not only adapted to be used for the above described separable machine but also for typewriting machines of any type and in various forms of construction.

The first form of construction shown by Fig. 1 has already been outlined above.

In the lower segment 8 two concentric axles 12 and 9 are arranged which carry together the intermediary levers 6. The purpose of a hollow space 48' between the two segments 16 and 8 will be explained hereafter.

The type-bar 1 is constructed in a manner known per se. When at rest it rests upon the cushions 2. It has in the well known manner two slots in its inner end between which a large gap 31 is left. One of the slots serves for mounting the type-bar upon the shaft 3. The slit 5 grips over the pin 7 at the upper end of the corresponding intermediary lever 6. The type-bars 1 are guided in radial slots 53 of the upper segment 16. The intermediary levers have each two curved slots 10 in the lower end between which a mouth 36 is formed.

The intermediary levers are mounted with their slots 10 upon the axles 12 and 9 of the lower segment 8 and laterally guided in radial guide slots 52 of the lower segment. A pull rod 14 is pivoted with its inner end upon a pin 32 of the intermediary lever 6 and it is further connected with said lever by means of a pull spring 15. The outer ends of the pull rods 14 are pivotally mounted upon pins 22 of movable links 24, which are movably mounted upon transverse axles 21 mounted in the frame of the typewriting machine. The links 24 are each connected with the corresponding vertical key rod 19 by means of bent connecting levers 23. The connection between the key and its pull rod could also be effected in another manner which will be hereinafter described.

The operation of the type-bar system is as follows:—

When a key 18 is being depressed, the corresponding link 24 is made to oscillate forward whereby the pull rod 14 is pulled forward. The intermediary lever 9 is thus swung in the forward direction around the axle 9 whereupon, when it has swung for a determined amount the inner end of its upper slot 10 comes in contact with the axle 12.

At the same time the end of the lower slot 11 goes away from axle 9. Up to this moment the lever arm with which the pull rod acts upon the intermediary lever had the length $x$ but now a shorter lever arm $y$ begins to act, wherefrom results that the upper end of the intermediary lever and thereby the type-bar moves with greater speed. The shorter lever arm has theoretically the effect that the forces with which the pull rod 14 has to be pulled must increase. This is however of no consideration for the key touch as the type-lever system has already been accelerated during the first part of its movement so that the accelerated masses balance practically the increased key resistance which would be theoretically caused by the shortening of the intermediate arm from the length $x$ to the length $y$. The action of the acceleration of the type-bar system is specially favourable in the upper part of its path when the type-bar is moving back. At the return movement the type-bar drops at first rapidly and moves more slowly later in consequence of the lever arm $y$ changing to the lever arm $x$. This is specially important for the reason that the types must move very quickly when they are at the highest position in order to make room for the succeeding type after they have struck the paper cylinder.

The pull spring 15 ensures an individual elasticity of the type-bar system but prevents in first instance that the type-bars 1 when dropping upon the bolster 2 jump back, wherefrom would result that the type-bars get hooked into one another.

A great typing speed of the typewriting machine is ensured owing to the improved construction of the type-bar system. The advantage is not obtained by a complication of similar constructions but by a considerable simplification of the same. The peculiar construction of the lower end of the intermediary type-bar 6 with the two slots 10 renders it further possible to remove the intermediary levers together with their pull rods without any difficulty when they have to be cleaned. If an intermediary lever has to be removed the corresponding key 18 is depressed so far that the type-bar 1 can be unhooked from the shaft 3. Owing to the mouthshaped opening 31 of the type-bar the slot 5 can be removed from the pin 7 and the type-bar 1 can be taken out. The pin 22 of the link 24 is pulled out sidewards and the pull rod 14 is free, so that the intermediary lever can be unhooked from the axles 12 and 9 owing to the peculiar form of the slots 10, and said intermediary lever together with its pull rod can now be removed in forward direction. This simple manner of removing the intermediary lever together with the pull rod is of great advantage for the manufacturing as well as for the repair and cleaning of the machine.

The removal of the type-bars can be further facilitated by the special arrangement which is shown in Fig. 12.

In the form of construction which has been described with reference to Fig. 3 the type-bars can be removed after the universal bar 33 has been pushed out of its position. The pushing out of the bar 33 can either be effected from the rear when the machine has been taken into two pieces or when the two parts of the machine are put together from the front. In the latter case the hand which has to push back the bar lies above the type-bars, whereby the removal of the same is impeded. To avoid this inconvenience a separate lever is arranged according to this invention which is adapted to be operated by means of a pull rod mounted in the front part of the key case so that it can be located in its position. Upon the shaft 45 a lever 230 is arranged (Fig. 12) whose upper arm can act upon the shaft 44. A pull rod 232 having a threaded part is connected with the lower arm of the lever by means of a small shackle 231. This pull rod 232 is acted upon by a pull spring 233 attached to the segment 8 in such a manner that the upper end of the lever is not in contact with the revoluble shaft 44.

The front end of the pull rod 232 is mounted in the front wall 17 of the key case in a boring 235 whose diameter corresponds with the diameter of the pull rod. A hand knob 236 is fixed upon the front end of the pull rod 232 by means of which said pull rod can be pulled forward. When the rod is being pulled forward two lateral lugs 237 of said rod enter the slot 238 of the boring. When the pull rod is being pulled out with the aid of the head 236 the lever 230 moves forward, whereby the oscillating shaft 44 and the universal bar 33 are pushed back. In this position the universal bar is locked by turning the head 236 to the right or to the left so that the flaps 237 stand transversely with regard to the slot 238. The type-bars are free and can be removed. After the type-bars have been reinserted the knob 236 is turned back to the normal position so that the lugs 237 stand in alignment with the slot 238 so that the pull rod can be returned to its initial position through the action of the pull spring 233. At the same time the lever 230 and consequently the universal bar 33 are returned to their initial positions.

The construction of the lever and of the pull rod, the mounting of said pull rod and the locking of the same in position can be varied according to requirement. Owing to the fact that between the two segments 16 and 8 a free space 48' is provided in the segment plate the mounting and guiding of the type levers and of the intermediary levers in the two segments 16 and 8 is greatly simplified.

In consequence of this construction of the corresponding radial slots 52 and 53 the segment plate it is possible to produce by one action of the slot cutter.

The construction of the type-bar system which has been hereinbefore described requires a rather accurate fitting of the axles 12 and 9 and of the corresponding slots 10 of the intermediary lever. The intermediary lever can however, according to this invention, be constructed, in preserving the special manner of double lever transmission, in such a manner that at the manufacturing and at the mounting together the degree of accuracy at the fitting it needs not be so great, this being obtained according to a further improvement by supporting the fulcrums of the levers upon a bracket so that they can freely pivot. Either only the lower supporting point can bear upon a bracket, the upper supporting point being again formed by an axle as can be seen from Fig. 13, or both supporting points can rest upon bracket surfaces which are superposed and displaced the one with regard to the other in conformity with the length of leverage as shown by Fig. 14, According to Fig. 13 the lower segment 8 is constructed so that upon its rear surface a bracket 239 is formed upon which rests the intermediary lever 6. The segment 8 carries further a transverse axle 240 which forms the common axle for all the intermediary levers 6. The intermediary levers have each at the lower supporting point a circular head 241. Somewhat above this head a slit 242 is arranged which serves for suspending the intermediary lever upon the axle 240. Owing to this construction the principle according to which the intermediary lever works is exactly like that according to which the intermediary lever works which, as shown by Fig. 3, is suspended upon two axles. At the first part of its stroke the lever acts with a leverage $x$ and at the second part of its stroke it acts with a leverage $y$. In this manner the movement is accelerated in the second part of the stroke in a similar manner as is the case in the construction shown by Fig. 3. The same refers to the lever construction shown by Fig. 14 which differs from that shown by Fig. 13 in so far that both fulcrums are supported by brackets. The intermediary lever is designated by 6. It has at the lower end a round head 243 bearing upon the bracket 244 and at a short distance above this lower head 243 a round extension 245 supported by the upper bracket 246 of segment 8. The lateral guiding is effected in the form of construction shown by Fig. 13 in such a manner that the segment 8 is either made from a piece which presents the cross section shown by Fig. 15 and which has slits 247 for the reception of the intermediary levers, or the segment is composed of separate pieces 248 as shown by Fig. 16. The intermediary levers 6 are connected with the pull rod 14 acted upon by the key levers. Between the lower part of the intermediary levers 6 and the pull rod a pull spring 16 is inserted for the same purpose as described with reference to Fig. 3, that is to say to ensure the individual elasticity of the lever system and to prevent the jumping back of the type levers 1 from the bolster 2.

The key levers are mounted in the machine frame in a novel manner.

As has been explained above with reference to Fig. 3, the keys and key levers can be mounted upon continuous longitudinal axles 21 fixed in the side plates of the typewriting machine. Herefrom results with key typewriting machines the inconvenience that the axles bend and that the keys are no longer situated at the same level. With a view to obviate this inconvenience the key levers are fixed according to this invention directly upon the guide plate for the keys as can be seen from Figs. 13 and 20. Small brackets 250 are provided on the inner surface of the guide plate 249 said brackets being preferably cast in one piece with the plate. The axles 251 for the key levers are mounted in said brackets. The key levers are composed each of two parts 252 and 253 (Fig. 17) one of said parts having at its free end a flap 254. These flaps are alternately bent off to the right or to the left and they serve as bearings for the eyes 255 of the pull rod 14. The two parts 252 and 253 of the key lever are connected by a small rivet bolt 256 (Fig. 18) which has an abutment block 257 (Fig. 19) which is securely clamped in between the two parts 252 and 253 of the key lever. A pin 258 is inserted through the upper slot between the arms of the fork shaped part of the key lever which has thus been formed, said pin 258 serving for holding the key rods 260 which are guided in borings 259 of the guide plate 249.

The parts of the elements 252 and 253 of the lever which are situated upon the other side of the bolt 256 are bent outwardly so that they form a rather large fork (Fig. 20) whose arms are mounted with their borings 261 upon the axles 251. The width of the opening of the fork of the key lever corresponds with the distance between the keys. As can be seen from Fig. 17 the key levers are all made from similar pieces 252 and 253 which are however arranged so that alternately the upper lever 262 has the element 252 at the right hand side and the element 253 at the left hand side, the lower lever 263 having the element 253 at the right hand side and the element 252 at the left hand side. The next lower lever 264 has again the element 252 at the right hand side and the element 253 at the left hand side, the next following lever 265 having the element 252 at the left hand side and the element 253 at the right hand side. The flaps 254 of the elements 253 are also not bent all to the same side but alternately to the right and to the left as can be seen by comparing the levers 262 and 263 with the levers 264 and 265. Owing to the alternating utilization of the unequal elements 252 and 253 and owing to the alternating bending off of the flaps 254 of parts 253 none of the pull rods 14 is situated directly over another pull rod 14 whereby disturbances in the typing could be caused otherwise. All the pull rods are arranged the one at the side of the other so that they do not interfere with each other when moving.

The abutment blocks 257 have at the upper end a concavity 266 which corresponds with the round shape of the rod 251. They could however be also cylindrical. A similar concavity 266 is provided in the lever arm of the elements 252 and 253 (Figs. 17 and 19). The key levers are mounted the one below the other as can be seen from Fig. 13 in such a manner that their lever arms pass below the axle 251 of the higher lever arm. This is possible as the key levers, as has been above described, are enlarged in fork-shape in proximity of their pivots so that, as can be specially seen from Fig. 20, the key rods 260 can move between the same without impediment. When the lever system returns to the initial position, this being effected by the influence of the distribution of weight and by the action of the pull springs 15, all the key levers come in contact with the axles 251, whereby their return movement is securely limited. Herefrom results the advantage that all keys 267 stand always at the same level above the guide plate 249. By limiting the movement of the key levers the movement of the intermediary levers which are connected with the same by the pull rods 14 is limited at the same time. If this limiting of the movement of the intermediary levers by means of the key levers did not exist, the intermediary levers would strike against the mouth shaped opening 31 of the typebars, whereby at the typing a noise would be produced. It is true that by the striking of the key levers against the axles 251 a noise is produced also but this noise is rather soft as on the one hand the key levers are essentially shorter than the intermediary levers and as on the other hand the abutment blocks 257 which come in contact with the axles can be made from a sound deadening material, e. g. vulcanite, fiber, leather, cardboard, ebonite or the like. When the intermediary lever 6 would strike back into the mouth shaped opening 31 of the type lever 1 metal would strike against metal which, owing to the great length of the lever 6 would produce a comparatively loud noise.

As has already been remarked a pull string 15 is arranged between the pull rod 14 and the intermediary lever 6. It is very important for the uniform working of the type writing machine to adjust the tension of the springs 15 always accurately when they are being mounted or repaired so that the touch does not become too hard and not too soft.

The connection of the springs with the aid of a shackle 268 soldered or clamped on the pull rod, e. g. as shown by Figs. 3 and 12, is not always advisable for this purpose as the tension of the springs has to be regulated by cutting the springs to a determined length, or by stretching the springs. It is better if all the springs can be of normal length, their tension being nevertheless adjustable with regard to the lever system.

The device shown in Figures 21 and 22 serves for this purpose. It consists of a sleeve 270, which mounted upon the pull rod 14, is open at its lower end where it has flaps 269. A clamping lever 272 is pivotally mounted between said flaps by means of a rivet bolt 271. The pull spring 15 is attached to the lower end of said lever. The upper arm of lever 272 is toothed and wedge-shaped so that when the lever is oscillated in the direction of the pull exerted by the spring a wedge action is produced between the toothed surface of the lever 272 and the pull rod 14 whereby the sleeve 270 is clamped upon rod 14. This clamping connection is always removable but it is otherwise so secure owing to the wedge action that the sleeve cannot be released accidentally by the vibrations caused by the typewriting, specially as the traction of the spring 15 assists this wedging action.

The form of construction of the typewriting machine shown by Fig. 13 comprises further a novel arrangement of the keys. It is generally known that all typewriting machines are calculated as regards construction specially of the type-bar system, the types, the carriage and the paper cylinder always for a determined maximum stress exerted by the typist. Typewriting machines are often damaged by rough touch so that parts of the type-bar system break, the types and the cylinder are worn prematurely and the inking ribbon is used up rapidly.

This inconvenience is obviated according to this invention by a new arrangement of the keys so that the stroke exerted upon the key is transmitted to the type-bar system by a spring whose normal tension is equal to the greatest admissible striking force.

The key rod 260 (Figs. 23–25) upon which the key head 267 of any convenient construction is fixed, is hollow at its lower part. In the boring 273 open at the lower end a special spring 274 is located. The key rod is connected, as mentioned above, with part 254 of the key lever by means of a bolt 258 traversing the two oblong holes 275, said bolt being clenched at both ends. The flap bearing 254 has thus a certain play owing to the bolt 258 being mounted in the oblong holes 275 of the key rod 260. The lower end of spring 274 bears upon the bolt 258 pressing the same into the lower ends of the oblong holes 275. The tension of spring 274 is so great at the normal position of said spring that it corresponds with the highest admissible striking force. It would for example be dimensioned so that the machine could type six copies without compression of the spring caused by the striking force required for this purpose. When the key is more forcibly struck by a rough typist the excessive strain is not submitted to the key lever system but it will be intercepted by spring 274 which will now be compressed. The type-bar system is therefore released of any excessive stress caused by hard striking of the keys. The spring 274 is inserted between the key and the type-bar system with various preliminary tension in accordance with the strength of construction of the typewriting machine. For lighter machines which could not stand any rough treatment the insertion of this spring in the type-bar system is the best security against destruction of the machine.

The head 267 of the key is connected with the key rod 260 in a special manner as can be seen from Fig. 13. The key rod 260 has at its upper end a boring 260″ and further two lateral slots 260′. A pin 267′ connected with the head 267 is slotted in longitudinal direction and it carries at the upper part just under the head two lateral projections engaging with the slots 260′. The split pin is inserted into the boring 260″ where it is securely fastened being besides secured against rotation by the projections engaging with slots 260′.

The invention relates further to the carriage and to the mounting of the frame of the platen. According to this invention the frame of the platen is pivotally mounted in supporting arms which are hingedly connected with the carriage, so that said frame 6 can be lifted and so that the platen itself can be shifted parallel with regard to the striking plane of the types.

There have already become known carriages of typewriting machines which consist of a slide and of a platen frame hingedly mounted upon the same by means of supporting arms. With typewriting machines in which the writing is hidden from view the arrangement is such that the frame of the platen can be lifted freely. This is necessary to expose the typing to view. Also from typewriting machines in which the typing is exposed to view constantly during the progress of the writing, constructions have become known according to which the frame of the platen can be lifted beyond the reversing position in order to bring the platen into a position in which erasures and similar operations can be effected upon the typed paper. In the known constructions of this type the frame of the platen was however not freely removable from the shift device but connected with the same either by articulation or by stops so that, when the frame of the platen had to be lifted beyond the shift position a ratchet device had first to be released by means of a key. This causes the grave inconvenience that the lifting of the frame of the platen into the erasing position necessitates numerous manipulations, the construction being further complicated and enlarged by the levers which ought to be avoided in consideration of the durability and simplicity of the typewriting machine.

It has further become known from typewriting machines in which the shift is effected by moving the frame of the platen up and down, to revolve the platen simultaneously with the shift movement in order to obtain that the platen is displaced itself parallel with regard to the plane in which the types strike the paper. The constructions which have been proposed for this purpose are however purely link-constructions and so arranged that it is impossible to lift the frame of the platen beyond the extreme shift position.

In order to avoid all these inconveniences the frame of the platen is, according to this invention, connected with the slide of the carriage in a manner known per se by supporting arms and pivotable with regard to these supporting arms, being however adapted to be freely lifted off the shift device at any position of the carriage. A number of advantages are thus realized which have already been obtained in older constructions by other means but have hitherto not become known in this totality. The possibility of freely lifting the frame of the platen at any position of the carriage, indifferently whether the same is at the shift position or at the initial position, at the right or at the left, involves the advantage that the frame of the platen can be lifted at any moment whereby again it has been rendered possible to place the margin adjustment directly under the platen. This is of special advantage as it is always desirable that the device for adjusting the starting point of the carriage be freely visible and accessible for the typist at any moment in its entire extension and in all parts. The other advantages are obtained besides, that the slide can be lifted at any moment into the erasing position without the intermediary of special control devices and that finally this possibility to freely lift the frame of the platen can be further utilized for the shift movement.

There is finally realized the peculiar advantage that the frame of the platen, with a special construction of its mounting in the slide, can be removed, as an individual part, at any position of the carriage, completely from the slide to be cleaned or repaired separately, an advantage which is evidently very valuable also for the manufacturing.

This idea of the invention is carried out by a novel type of determining the range of the shift movement and of securing the frame of the platen in the erasing position.

The equipment of the carriage with a frame of the platen freely to be lifted leads further to absolutely novel constructions of the control device for the carriage and it permits specially to provide a novel construction of the rack gear and of the spacing device.

The improved carriage is shown in the accompanying drawing specially by the Figures 3, 12 and 26 to 40.

The slide or base plate 153 for the carriage is arranged in the rear part of the machine in a guide way 153' (Fig. 3) transversely on the machine in a manner known per se. It has at its ends small bearing arms 276. These arms 276 have borings 148 (Fig. 5) designed to receive the spring influenced bolts 150 of two supporting arms 277. These supporting arms 277 have fork-shaped front ends (Fig. 27). Bushings 278 are inserted, one in each fork-shaped end, the cylindrical neck 279 of said bushing being screwed with the threaded part 280 in one side of the fork and secured in this position by a counter nut 281. The bushings 278 are perforated and carry by means of the spindle 282 the platen 167. At the ends of the platen spindle 282 turning knobs 283 are provided. The cylindrical parts 279 of the bushings 278 serve at the same time as pivoting axle for the side plates 152 of the platen frame mounted between the fork-shaped ends (Fig. 28). Each of the side plates 152 has an incision 284 open at the rear end in which the supporting arms 277 can move freely.

The side plates 152 are connected the one with the other by means of margin adjusting bars 112 and 112' which are arranged below and somewhat behind the platen 167 and by a connecting rod 285 so that they form a solid platen frame. At the middle a pulley 99 is revolubly mounted between the bars 112 and 112', said pulley being adapted to slide to and fro upon a guide path 100 of convenient construction of the shift plate 92 movably mounted so that it can be raised and lowered (as has already been hereinbefore described). The pulley serves at the same time as guide and as support for the oscillable platen frame. When the shift plate 92 is raised by any convenient shift device the pulley 99 and with it the platen frame are raised also. This vertical movement effects an oscillation of the platen frame around the axle 148 and further a rotation around the spindle 282 (Fig. 12). This double movement of the platen frame is necessary for the following reasons. In all typewriting machines the platen is coupled with the platen frame by the device for line spacing; it is the same in the improved typewriting machine according to this invention. If the platen frame were not revoluble around the spindle 282 but rigidly connected with the supporting arms 277, the platen would adopt the position $x$ (Fig. 12) when the shift plate 92 is being raised. The types would strike the platen at the point B. The tangential plane placed on the platen at this point B runs in the direction C—C, that is to say it forms an acute angle E with the vertical plane D—D of the types. This would have the result, that the type heads would strike more strongly with their lower part than with their upper part. The capital letters typed would therefore have weakly typed heads. To avoid this the additional revolving movement of the platen around its spindle 282 is provided. The stroke of the shift plate 92 is so great that the platen frame is not oscillated, as in the case just described, for an angle A but beyond this angle for an angle F. The platen itself is turned back around the spindle 282 in the direction of the arrow for the angle G, which is possible owing to the fact that the lever arm 277 can displace itself in the aperture 284 of the side plate 152. The lower edge 286, which at the upward movement comes in contact with the lower edge 287 of the supporting arm 277, limits thus the oscillating movement as well as the pivoting movement around the spindle 282. When the shifting movement is finished, that is to say when the edge 286 comes in contact with the edge 287, the platen is in the position $y$ shown by dash and dot lines in Fig. 12. Point B has been turned back from position B' into the correct position B by the rotation for the angle G. If now the tangential plane is placed on the point B it will be seen that the same is exactly parallel with the vertical plane D—D of the upper type. A uniform striking of the type over the entire height is thus ensured in the same manner as in the initial position where also the tangential plane coincides with the vertical plane of the lower type.

As mentioned above the two parts 152 are connected the one with the other by margin bars 112 and 112'. Upon the front bar 112' the margin stops 105 are mounted which can be released and adjusted by pressure upon the elastic lever 105' (Figs. 3 and 5). This adjusting of the margin adjustment arranged below the platen is however possible only because the platen frame can be lifted for a required distance independently of the movement of the shift plate 92.

In order to catch the platen frame automatically in the lifted position and to support the same a special locking device is provided whose construction can be seen from Figs. 30, 31 and 34. In order however to describe this construction in detail, it is necessary to further describe the construction of the platen frame with reference to Figs. 26 to 29. Upon the connecting rod 285, in close proximity to the inner surfaces of the side plates 152 (Fig. 26), two lever arms 288 are pivotally mounted which are connected the one with the other by a flat bar 289. This flat bar carries somewhat at the side of its middle an abutment 290 (compare also Figs. 30 and 31). The levers 288 have laterally bent flaps 291 at their upper ends (compare Figs. 30 and 31) against which bear the front ends 292 of two spring influenced shifting pins 293. These pins 293 are mounted in horizontal sleeves 294 fixed on the top of the side plate 152 of the platen frame. Springs 295 are located, one in each of said sleeves 294, which serve for pushing the pins 293 forward so that they project from their sleeves.

A lever 297 acted upon by a spring 298 is pivotally mounted upon a bolt 296 of the carriage 153 (compare Figs. 30, 31 and 34) so that it can oscillate in horizontal direction. In proximity of the fulcrum 296 this lever 297 presents a vertically bent part 299. It is forked at the end and embraces a vertical stud 300 of a supporting arm 302 which is adapted to oscillate around the bolt 301 for about 90°. This supporting arm 302 is bent at its lower end so as to form a supporting surface provided with an incline 304.

In the normal position (compare Fig. 30) the supporting surface 303 is pressed flat against the front side of the carriage (compare also the position 303′ shown in dotted lines in Fig. 34). When the platen frame is lifted the spring 298 begins to act and makes the lever 297 swing forward. This lever draws along the bolt 300 whereby the supporting surface 303 is turned for 90° in the direction of the arrow of Fig. 34 so that it bears now perpendicularly against the front side of the carriage 153. When the platen frame is now released it cannot drop back into the normal position because the connecting rod 285 (compare Fig. 31) comes in contact with the edge 304 maintaining thus the platen frame in the lifted position. The line which has been typed before the lifting of the frame is in this lifted position out of the range of the inking ribbon and of the type guides, it is absolutely free so that erasures can be made by retyping. The advantage is thus obtained that it is not necessary to turn the platen itself in the frame, wherefrom inconveniences could arrive, e. g. a displacement of the line, particularly when several paper sheets are on the platen. In order to bring the platen frame back to its normal position it is sufficient to push inward the spring influenced pin 293. This pin, indifferently whether it is the right or the left pin, pushes back the lever 288, which stands in front of it and the abutment 290 mounted upon the flat bar 289 comes now in contact with the vertical bend 299 of the lever 297 (compare Fig. 31). When the pin 293 and consequently the abutment 290 are pushed inward still more the bend 299 and with it the lever 297 are also pushed back. The lever when moving backwards takes along the stud 300 whereby the vertical abutment surface 302 is brought back to the position 303′ shown by Fig. 34. The connecting rod 285 is thus released and the platen frame can return to the normal position.

In order to prevent that the dust produced by erasing drops in the bearings of the type bars a protecting rail 305 is pivotally mounted below the clamping device for the paper sheet arranged below the platen 167 and upon the front axle 304 of the same. This protecting rail is connected with the clamping device by two links 306, one at either end, and by the arms 288 by means of a bolt 307, adapted to slide in a slot 308 of the link. When the platen frame is lifted the links bring the bar 305 into the initial position, according to Fig. 31. When the lever arms 288 are moved backwards in consequence of a pressure exerted upon the pins 293, the links 306 draw the protecting rail 305 along and place the same tightly against the platen as shown by Fig. 30. During the erasing (compare Fig. 31) the dust from erasing drops upon the rail 305 which prevents said dust from dropping forward into the machine and which lets the same drop into the frame of the typewriting machine below the platen behind the bearing of the type bars when said platen is lowered again. In this manner the very sensitive radial bearings of the type bars and of the intermediary type bars are protected against the dust from erasing.

The rail 305 could however also be operated in another manner (e. g. as shown by Figs. 32 and 33).

The rail 305 is pivotally hinged to the axle 304 of the clamping device for the paper sheet and it is pressed outward, away from the platen, by means of a spring 309 (compare Fig. 35 and direction of the arrow in Fig. 32). The bar carries at its right hand end a lever arm 310 to which an adjusting rod 311 is pivotally hinged. This adusting rod 311 is guided in an eye 312 of the margin adjustment bar 112′ (Fig. 26) (left hand side, Fig. 32, Fig. 33). The adjusting rod 311 bears with its outer end against a counterplate 313 which is fixed to the rack 147 of the carriage guide (Fig. 5 right hand side Figs. 32 and 33). When the carirage is in the normal position (Fig.

32) the adjusting rod 311 pushes, owing to the fact that it bears against the plate 313, the rail 305 against the platen in opposition to the action of the spring 309 which is indicated by the arrow. When the platen frame is being lifted and the fulcrum 314 of the adjusting rod is moved away from the counter bearing 313 the spring 309 begins to act and turns the rail 305 away from the platen 157 towards the outside into such a position that the dust from erasing is caught by this rail 305. When the platen frame is lowered again the adjusting rod 311 enters into action owing to its contact with the counter plate 313 and it presses the protecting rail 305 against the platen 167 in opposition to the action of spring 309.

With this form of construction of the carriage a special operation of the rail 305 by means of the pins 293 is no longer necessary when the platen frame is lifted or lowered, in contradistinction with the form of construction shown by Figs. 30 and 31.

The pins 292 designed to operate the device as shown by Figs. 30 and 31 serve besides for another purpose, namely to release the carriage. The movement of the carriage 153 is effected in the well known manner by the pull of a controlled string 156 guided over a pulley 154 and attached to the spring barrel 155 (compare Fig. 5). The carriage 153 has a rack 147 at the front side (compare also Figs. 3, 5, 12, 30, 31, 32, 33) which meshes continuously with a pinion 146 rigidly mounted in the frame of the machine. At the rear of the carriage guide the spacing and ratchet wheel 137 is keyed upon the axle 315 of the pinion 146 (compare Fig. 3), said ratchet wheel being locked by a locking device, or escapement dog rocker. This locking device consists of a pawl 144 which is pivotally mounted upon a pin 190 of the support 43 and acted upon by the spring 191. The support 43 is pivotally mounted on an axle 189 fixed in the machine frame 188 so that it can oscillate around this axle (Figs. 3 and 10). The pawl has a surface 316 which stands perpendicular to the plane of the ratchet wheel 137 and an inclined wedging surface 317 (Fig. 38). A comparatively small edge 318 is left between these two surfaces. A small pulley 320 is arranged in the support 43 opposite the pawl so that it can turn around a vertical stud 319. The distance between the pulley 320 and the knife edge 318 is smaller than the width 321 of the ratchet wheel 137. This locking pulley 320 is further displaced for the small amount y with regard to the vertical surface 316 of the locking knife 144.

The pawl has at its circumference a number of teeth 322 which present radial front surfaces 323 and rear surfaces 324 which are undercut in wedge shape (compare Fig. 37). The pawl engages between two teeth of the ratchet wheel when it is in the position of rest, its straight surface 316 bearing against the straight front side 323 of the locked tooth. If now, either by depression of the idle key or by the striking of a type, the device which serves for releasing the locking device, in the present form of construction the spring controlled rod 41 (compare Figs. 3 and 10), is pushed back, the straight surface 316 releases at first the locked tooth. The ratchet wheel revolves in the direction of the arrow shown by Fig. 38 and in Fig. 10 but only for the small amount x to come immediately in contact with the locking pulley 320. This small rotation for the amount x which corresponds to the width of the edge of the locking knife 318 is sufficient to effect the reliable locking of the succeeding tooth. When namely the support 43 returns under the action of spring 195 to its initial position the locking pulley 320 releases the locked tooth so that the ratchet wheel can further rotate. As however the distance between the pulley and the edge 318 of the locking pawl is smaller than the width of a tooth and as further the ratchet wheel has already advanced for the amount x the locking pawl can, owing to the inclined form of its flange 317 and owing to the inclined undercutting 324 of the locking teeth get into the gap in front of the next tooth when said pawl moves backwards, whereby the locking of the next tooth is effected. Owing to this arrangement it is prevented that a spacing could be jumped over and several teeth could be turned as this happens frequently with typewriting machines in which the pinion does not continuously mesh with the rack as in this improved machine. The back spacing of the locking device is effected by means of a back spacing pawl 136 of well known type which is operated by a lever 134 whose operation can be effected in any convenient manner. The inclined undercutting of the locking teeth 322 and the corresponding bevelling of the flange 317 of the pawl permit, in connection with the fact that this pawl is spring controlled in the support 43, to pull the carriage or the slide connected with the same to the right without the aid of a separate shifting device as at the movement of the slide and the positive rotation of the ratchet wheel 137 caused thereby, the pawl gives way when the teeth are passing along but locks the ratchet wheel at once when the back rotation is interrupted.

In order to release this locking device also for the movement of the slide or of the carriage to the left a special device is provided which is operated, as has already been mentioned, by the pins 293. Two levers 185 are pivotally mounted in bearings 325 laterally at the front edge of the carriage 153 (Figs. 3, 5, 30, 31) said levers being connected by means of a continuous rod 186. This rod 186 bears with its front end against a releasing rod 186' which is spring controlled and mounted in the frame of the machine perpendicular to the direction of movement of the slide. On the other hand the rear edge of the bar 289 (compare Figs. 30, 31) comes in contact, according to the position of the slide, with the one or with the other of the levers 185. If now one of the pins 193 is pushed inward the bar 289 moves back one of the two upper levers 185 whereby the rod 186 is pushed back at the same time (compare Figs. 3 and 30). This rod 186' acts with its rear end upon the pawl and presses the same out of the range of the locking teeth approximately into the position shown in dotted lines on Fig. 3. As the support for the pawl and the locking pulley 320 have remained at rest the ratchet wheel is completely free and the slide can be moved to and fro in both directions without being hindered by the locking device.

In this manner it is possible to release, by means of the pins which effect the locking of the platen frame in the erasing position, at the same time the locking device of the slide.

As mentioned above the two side parts 152 of the platen frame are connected by the two margin adjusting bars 112 and 112' and by the rod 285. This rod 285 serves for maintaining the platen frame in the erasing position and further as bearing for the levers 288 (compare Fig. 26). It serves however still for another purpose namely to support the clamping device or feed rolls for the paper sheet. Two arms 326 are pivotally mounted upon the axle 285 (compare also Figs. 26 and 28). Their hubs 327 are connected, by means of torsion springs 329, with adjusting rings 328 clamped upon the rod so that they are continuously pressed towards the platen. The ends of the arm 326 form bearings 330 for pins 331 fixed to the clamping device for the paper sheet (compare Fig. 35). The clamping device for the paper sheet consists of an oblong plate of sheet metal 332 which is bent shield-like (compare Fig. 36) and which carries at either side rollers 333 of india rubber pivotally mounted on axles 304. The front axle 304 serves, as has been mentioned above, at the same time for mounting the rail 305 designed to catch the dust from erasing. In order to permit the lifting of the clamping device for the paper sheet a cranked shaft 334 is arranged between the side walls 152 of the platen frame, as shown by Fig. 26, said shaft resting with its cranked part upon the arms 326. The crank shaft has at one end a crank shaped extension 335 with which an adjusting lever 336 is connected. This adjusting lever is further connected with an angle piece 338 adapted to pivot around an axle 337. The angle piece can be adjusted with the aid of the spring knob 341 upon a segment 340 provided with notches 339. When the piece 338 is turned to the right as shown in Fig. 26 the crank is pressed down and the clamping device for the paper sheet is lifted. In the other position the crank shaft 334 liberates the arms 326 so that under the action of the spring 329 these arms press the platen.

A line spacing device of convenient construction is arranged upon the other side of the platen frame.

The platen frame is mounted, as has already been mentioned, upon the slide by means of spring influenced bolts 150 so that it can be oscillated (compare Figs. 27 and 5 left hand side). When the milled handles 342 of these spring influenced bolts are pulled outwards the pins 150 get out of their bearings 148 and the platen frame can now be freely removed from the slide. This arrangement is also of great advantage for the manufacturing as well as for the repair and for the cleaning of the machine.

It is well known, that the adjusting of the platen or of the carriage is regulated for the normal thickness of the paper to be typed. The machine types well with this normal adjustment only when the thickness of the paper does not exceed considerably the normal thickness. In the case which is rather frequent where three and more copies have to be typed on one machine the types do no longer strike properly against the platen or upon the paper.

When the platen is replaced by a new one it happens also sometimes that the new platen has not exactly the same diameter as the old platen whereby a deviation of the striking of the types is caused.

It has therefore been proposed to make the carriage adjustable in such a manner that the platen can be properly adjusted with regard to the normal position of the types specially when the same is being exchanged.

The invention has further for its object the application of this adjusting of the platen known per se to the device which has been hereinbefore described with reference to Figs. 5 and 27.

In this construction the platen frame, as has been explained above, can be removed from the machine by pulling out laterally the pins from the borings 148. According to Figs. 39 to 41 the bearing pins are not inserted into fixed borings but into boring 343 which are arranged eccentrically in revoluble sleeves 344. These sleeves can be turned in the small bearing brackets 276 mounted upon the slide 153 of the carriage. By turning the bearing sleeves 344 it is possible to displace the borings 343 which are eccentrically arranged in the same, the position of the platen frame with regard to the type being thereby varied. The bearing sleeves 344 have a shaft 345 which projects through the inner wall 346 of the bearing 276. An operating shaft 347 is connected with the shaft 345 of the two sleeves, said shaft being located between the bearings 272 and being further connected with the shafts preferably by small worms 348.

The handle shaft 347 carries at the middle a small handle 349 rigidly connected with the shaft by a pin 350 or by another convenient means. The handle has in the lower part of its circumference, as shown by Fig. 41, a number of notches with which the locking nose 351 of a spring fixed upon the carriage 153 can engage.

The end face of the bearing sleeves 344 has a division line 352 and a graduation 353 is arranged upon the adjacent circumference of the bearing. The carriage is locked in a similar manner as described with reference to the form of construction shown by Figs. 5 and 27, viz, so that the spring mounted pins 150 of the arms 277 are withdrawn from the sleeve 342 to spring into the borings 343 when the platen frame is mounted in place. When the paper is of normal thickness the sleeve adopts the position shown by Fig. 39. If however, for any reason the platen has to be moved back with regard to the normal type position, the handle 349 is depressed in the direction of the arrow (Fig. 41) so that the eccentric bearing 343 of the pins is turned to the left, whereby the platen is moved back. If for example the eccentric bearing is turned to the left for two graduations the spring 351 jumps from the middle notch into the second but next notch and secures the two eccentric bearings in this new position.

The arrangement of the revoluble bearings presents further the following advantage for the adjustment of the bearing of the platen frame.

A small adjusting screw 354 is arranged at the inner end face of the revoluble bearing sleeves 344 which projects only little from the end face of the bearing sleeves. When this screw 344 is turned the position of the bearing sleeve is adjusted in such a manner that an exact adjusting of the pin bearings 343 in accordance with the width of the carriage or with the exact distance between the pins 150 is possible. The same result can however be obtained when the small adjusting screw 354 is inserted in the end face 346 of the casing 276 of the bearing so that its contact surface bears against the end face of the bearing sleeves.

The invention is not limited as regards the constructional details to the form of construction which has been hereinbefore described by way of example. It is essential that the platen frame be not only mounted upon the carriage so that it can be lifted but also so that it can be pivoted around the spindle of the platen wherefrom follow per se the capability to be lifted for the adjustment of the margin stop or for the purpose of erasing and the simple shifting of the carriage in the prescribed manner.

It is known to use with typewriting machines devices designed to release the platen from the ratchet wheel in order to permit the adjusting of the paper independently of the spring device and to recouple it with the same. Most of the devices of this type are constructed so that one of the knobs, mostly that at the right hand end of the spindle of the platen is pushed inward axially whereby the uncoupling is effected. When the knob is released the coupling is automatically thrown in gear. An inconvenience connected with such devices is that the typist must hold with one hand the coupling in the released position whilst the platen is being adjusted, a free manipulation of the platen from both sides being thus impossible as one hand has always to maintain the release.

This invention had for a further object to avoid this inconvenience by effecting the coupling and uncoupling of the platen with the ratchet wheel with the aid of coupling sleeves adapted to be revolved from the outside and to be displaced in axial direction, said sleeves being automatically locked in both positions.

This part of the invention is shown by way of example by Figs. 42—45.

The coupling sleeve 361 adapted to be displaced in axial direction and forming an important part of the improved device is shown in Fig. 42 in section and in Fig. 44 in plan view. This sleeve 361 is loosely mounted on the spindle 362 of the platen so that it can be freely revolved by means of a hand lever 363 for which a milled or roughened drum handle could be substituted. The coupling sleeve 361 presents upon the outer end face a wedge shaped tooth 364 designed to engage with a wedge shaped groove 365 of a counter bearing 367 fixed upon the platen frame or upon the bearing sleeve of the same. When the coupling sleeve is turned by means of the handle 363 in the direction of the arrow Fig. 44 tooth 364 goes out of the wedge shaped groove 365 and owing to the wedge action the coupling sleeve 361 is pushed to the right. This movement to the right stops only when the point of tooth 364 has arrived upon the plane end face of the counter bearing 367. In order to prevent that the coupling sleeve be turned back, e. g. by friction when the platen is being turned, a small notch 368 can be arranged in front of the wedge shaped groove.

A conical sleeve 370 is pressed by the action of a spiral spring 369 against the inner end face of the coupling sleeve 361 not directly but through the intermediary of a spiral spring 371 inserted between the platen spindle 362 and the conical sleeve 370. This conical sleeve 370 is mounted in a coupling casing 372 rigidly connected with the platen 373 so that said sleeve can be displaced in axial direction. In the casing 372 four coupling arms 374 are arranged so that they can be moved radially (cfr. also Fig. 43). These coupling arms 374 which are shown on a larger scale by Fig. 45 have a sharp edge 375 or several such edges and a boring 376 in which a small spiral spring 377 is located and further a small bolt 378 with a rounded outer end 379. The edges 375 of the arms 374 engage between the fine teeth of the inner toothed crown 380 of the ratchet wheel 381. In order to prevent the arms from dropping out towards the end face the casing 372 is closed at its outer end by an annular disk 382 fixed upon the casing by means of screws 383.

The coupling acts as follows:—

When the coupling sleeve 361 is revolved in the direction of the arrow Fig. 44, it is shifted to the right and pushes back the conical sleeve 370. The cone 384 of this sleeve 370 sliding between the arms 374, these arms can move inward radially by the action of their springs 377 whereby their edges 375 get out of the inner toothed crown 380 and the coupling is released. The platen can now be freely turned with regard to the ratchet wheel 381. The spring influenced bolts 378 which project from the arms 374 do not impede this free movement of the platen as a smooth circular groove 385 is provided at the middle of the toothed crown 380 in which said bolts can slide, the toothing with which the edges 375 of the arms 374 engage being arranged at the side of this smooth groove.

The coupling sleeve 361 cannot return accidentally to the coupling position but remains in the releasing position as, in case the said sleeve 361 should be turned by friction, the small notch 368 will stop the back rotation of the coupling sleeve.

If now the coupling sleeve 361 is turned back in the direction opposite to that of the arrow (Fig. 44) the tooth 364 snaps back under the pressure of spring 371 into the wedge shaped groove 365 and the conical sleeve 372 moves to the left under the action of spring 369 so that the cone 384 presses the arms 374 outward, bringing their edges 375 in engagement with the fine teeth of the crown 380. The platen 373 is again coupled with the ratchet wheel 381. The arms 374 cannot move inward by themselves as the tension of the springs 377 is only just sufficient to move the arms radially inward. The tension of the spring 369 ensures the left hand end position of the conical sleeve 370 and of the coupling sleeve 361. It is evident that the spring 371 must be less strong than spring 369 in order to ensure a secure coupling movement of the conical sleeve 370.

The construction of this coupling device can be modified according to requirement. It is however essential that the coupling and uncoupling be effected with the aid of a coupling sleeve adapted to be shifted in axial direction and adapted to be revolved from the outside and to be stoped automatically in both end positions.

I claim:—

1. A typewriting machine embodying two independent sections separated along a transverse plane, separable cooperating centering means on said sections to properly aline the same, means for detachably securing the sections fixedly together, each of said sections being constructed to be directly and independently supported on the same support by its individual base, the rear section carrying the platen and its controlling devices and the front section carrying the printing instrumentalities.

2. A typewriting machine embodying two independent sections separated along a transverse plane, separable cooperating centering means on said sections to properly aline the same, means for detachably securing the sections fixedly together, each of said sections being constructed to be directly and independently supported on the same support by its individual base, the rear section carrying the platen and its controlling devices and the front section carrying the printing instrumentalities, key-actuated means for actuating the platen-controlling devices, and means for detachably connecting the sections, said key-actuating means embodying a universal bar.

3. A typewriting machine comprising a front frame having a space-lever and an oscillating shaft supporting the universal bar, a rear frame having a spacing-rod and a displaceable rail mounted thereon, said spacing-rod being provided with a head at one end adapted to be engaged by said spacing-lever, oscillating shaft and displaceable rail, for the purpose set forth.

4. A typewriting machine comprising a front frame having mounted thereon a series of type-bars and an oscillating shaft having a universal bar, a rear frame having a spacing-rod provided with an enlarged head at one end, and a displaceable rail on said rear frame mounted to be shifted behind said enlarged head to lock the spacing means, said head also being adapted to be engaged by said oscillating shaft to operate the spacing means.

5. An improved typewriting machine comprising in combination a front frame and a rear frame having separate and independent supporting bases, a segment-plate on the front part of the frame having mounted on its rear side a transverse shaft on which are rotatably mounted the shift-lever for the platen, the space-lever operated by the space key and two swinging arms which carry at their ends a ribbon shaft pawl engaging with the ribbon-shifting-device, and also a shaft mounted on the swinging arms and a universal bar hinged to it and operated by the type-bars to move the spacing-rod disposed in the rear frame, and a lever mounted to rotate freely on the said shaft to move an ink ribbon shifting device disposed on the front part of the frame.

6. A typewriting machine embodying a series of keys and type-bars, intermediate levers interposed between said keys and type-bars, and parallel pivot-rods for successively supporting each of said intermediate levers at two points when actuated by the depression of a key to vary the leverage of said lever.

7. A typewriting machine embodying a series of keys and type-bars intermediate levers interposed between said keys and type-bars, and means for successively supporting each of said intermediate levers at two points when actuated by the depression of a key to vary the leverage of said lever, each of said levers being provided with separate guiding slots for said pivot-rods which have a common opening through the edge of the lever to permit removal of the levers from the pivot-rods.

8. In a typewriting machine, a series of type-bars, a universal bar adapted to be operated by said type-bars, a lever mounted adjacent said universal bar for operating the same independently of the type-bars, a pull-key, a connecting-rod between said lever and pull-key, and cooperating locking means on said connecting-rod and key casing of the machine for locking the universal bar in a position to permit the removal of the type-bars.

9. In a typewriting machine, a plurality of rows of keys and connections for operating the type-bars including pivoted lever-arms and connecting-rods, each lever-arm being formed of two bars connected together intermediate their ends by an abutment block and pivoted at one end to the lower end of the key and whose rear ends are bent outwardly and rearwardly to form spaced-apart pivotal points which are mounted on the pivot-rods extending across the machine, one of said bars having its rear end turned forwardly to provide a mounting for the rear end of its connecting-rod.

10. In a typewriting machine, a series of keys and type-bars, intermediate levers interposed between said keys and type-bars, connecting-rods between said intermediate levers and the key mechanism, and springs connected by one end to the intermediate levers and by the other end to connectors comprising a shackle provided with a wedge lever to clamp against the connecting-rod connecting each intermediate lever with its connecting-rod to thereby adjust the elasticity of each single type-bar-lever system.

In testimony whereof I affix my signature in presence of two witnesses.

FRANZ SÁNDOR.

Witnesses:
GEORGE RILLEY.
JAKOB KRAUS.